(12) United States Patent
Durvasula et al.

(10) Patent No.: US 11,645,548 B1
(45) Date of Patent: *May 9, 2023

(54) AUTOMATED CLOUD DATA AND TECHNOLOGY SOLUTION DELIVERY USING MACHINE LEARNING AND ARTIFICIAL INTELLIGENCE MODELING

(71) Applicant: MCKINSEY & COMPANY, INC., New York, NY (US)

(72) Inventors: Sastry Vsm Durvasula, Phoenix, AZ (US); Neema Uthappa, Phoenix, AZ (US); Sriram Venkatesan, Princeton Junction, NJ (US); Sonam Jha, Short Hills, NJ (US); Jaspreet Singh, Fair Lawn, NJ (US); Rares Almasan, Phoenix, AZ (US)

(73) Assignee: MCKINSEY & COMPANY, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/856,521

(22) Filed: Jul. 1, 2022

Related U.S. Application Data

(63) Continuation of application No. 17/506,536, filed on Oct. 20, 2021, now Pat. No. 11,416,754.

(51) Int. Cl.
  *G06N 5/02* (2023.01)
  *G06N 5/022* (2023.01)

(52) U.S. Cl.
  CPC .................................. *G06N 5/022* (2013.01)

(58) Field of Classification Search
  CPC .................................................... G06N 5/022
  See application file for complete search history.

(56) References Cited

U.S. PATENT DOCUMENTS

| | | | |
|---|---|---|---|
| 2020/0004582 A1* | 1/2020 | Fornash | H04L 67/1008 |
| 2020/0304571 A1* | 9/2020 | Ranjan | G06F 3/0649 |
| 2021/0174280 A1* | 6/2021 | Ratnapuri | H04L 67/148 |

* cited by examiner

*Primary Examiner* — Lut Wong
(74) *Attorney, Agent, or Firm* — Marshall, Gerstein, & Borun LLP; Randall G. Rueth

(57) ABSTRACT

A method includes receiving first input, analyzing the first input using a first model, receiving second input, analyzing the second input using a second model; and generating infrastructure-as-code. A computing system includes a processor; and a memory comprising instructions, that when executed, cause the computing system to: receive first input, analyze the first input using a first model, receive second input, analyze the second input using a second model; and generate infrastructure-as-code. A non-transitory computer-readable storage medium storing executable instructions that, when executed by a processor, cause a computer to: receive first input, analyze the first input using a first model, receive second input, analyze the second input using a second model; and generate infrastructure-as-code.

20 Claims, 24 Drawing Sheets

AUTOMATED CLOUD DATA AND TECHNOLOGY SOLUTION DELIVERY USING MACHINE LEARNING AND ARTIFICIAL INTELLIGENCE MODELING

CROSS-REFERENCE TO RELATED APPLICATIONS

This application is a continuation of U.S. patent application Ser. No. 17/506,536, entitled AUTOMATED CLOUD DATA AND TECHNOLOGY SOLUTION DELIVERY USING MACHINE LEARNING AND ARTIFICIAL INTELLIGENCE MODELING, filed on Oct. 20, 2021, and now issued as U.S. Pat. No. 11,416,754, which is hereby incorporated by reference in its entirety.

FIELD OF THE DISCLOSURE

The present disclosure is generally directed to techniques for automated cloud data and technology solution delivery using machine learning and artificial intelligence modeling, and more particularly, for training and operating one or more machine learning models to analyze current and future architecture state information and generate infrastructure-as-code.

BACKGROUND

Cloud data and technology solution delivery and transformations are costly affairs and take a long time to execute due to manual design, development, test, and delivery processes that are largely dependent upon expert engineering talent that is challenging to afford, or to acquire for small and large organizations alike. Data curation and data management processes like data accuracy, data cataloging, de-duplication, data security, data anonymization, data governance and suitable architecture delivery processes are prone to various risk factors including human errors due to lack of knowledge and execution, as well as time constraints. Empirical data indicates that 70% of budgets for given migration projects are consumed by data readiness operations. The knowledge required for an efficient technology delivery transformation is distributed across multiple areas and is neither governed nor consolidated and centralized to enable proficient blueprints required for such complex transformations. Data and technology landscape across multi-cloud and hybrid cloud solutions with varied service offerings are highly complex to comprehend. Still further, conventional static visualization techniques that are shared across many organization are inefficient, because among other things, users are not able to apply filters and such visualizations do not update to keep pace with changes in data over time.

Simply put, conventional environmental provisioning techniques are inadequate. Complex delivery problems present in modern deployments (e.g., on premises, multi-cloud, leveraging cloud hosting in open source solutions, etc.) are not fully addressed. Each customer's existing computing environment may include legacy services that must be individually analyzed, resisting any systematic approaches. Further, provisioning and migration strategies provide no guarantees regarding system completeness/validity. Furthermore, current state/architecture must be assessed manually, and provisioning decisions are frozen in time, and not adjusted based on new or changed information. Further, conventional technologies do not leverage or systematize institutional knowledge. Improved techniques that solve existing pain points are needed.

BRIEF SUMMARY

In one aspect, a computer-implemented method for automated cloud data and technology solution delivery using machine learning and artificial intelligence modeling includes (i) receiving input current data and architecture state information; (ii) analyzing the input current data and/or architecture state information using a first machine learning model trained by accessing codified knowledge; (iii) receiving input future data and architecture state information; (iv) analyzing the input future data and/or architecture state information using a second machine learning model trained by analyzing one or more historical labeled inputs; and (v) generating infrastructure-as-code corresponding to a future computing environment.

In another aspect, a computing system for automated cloud data and technology solution delivery using machine learning and artificial intelligence modeling includes one or more processors; and a memory comprising instructions, that when executed, cause the computing system to: (i) receive input current data and architecture state information; (ii) analyze the input current data and/or architecture state information using a first machine learning model trained by accessing codified knowledge; (iii) receive input future data and architecture state information; (iv) analyze the input future data and/or architecture state information using a second machine learning model trained by analyzing one or more historical labeled inputs; and (v) generate infrastructure-as-code corresponding to a future computing environment.

In yet another aspect, a non-transitory computer-readable storage medium stores executable instructions that, when executed by a processor, cause a computer to: (i) receive input current data and architecture state information; (ii) analyze the input current data and/or architecture state information using a first machine learning model trained by accessing codified knowledge; (iii) receive input future data and architecture state information; (iv) analyze the input future data and/or architecture state information using a second machine learning model trained by analyzing one or more historical labeled inputs; and (v) generate infrastructure-as-code corresponding to a future computing environment.

BRIEF DESCRIPTION OF THE DRAWINGS

The figures described below depict various aspects of the system and methods disclosed therein. It should be understood that each figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present aspects are not limited to the precise arrangements and instrumentalities shown, wherein.

DETAILED DESCRIPTION

Overview

The aspects described herein relate to, inter alia, machine learning techniques for environmental discovery, environmental validation, and/or automated knowledge engine generation, and more particularly, to training and operating one or more machine learning models to analyze current and future architecture state information and generate infrastructure-as-code.

Specifically, the present techniques include methods and systems for modularizing and codifying processes for performing environmental discovery/scanning, environmental validation, and automated knowledge engine generation using machine learning (ML) and/or artificial intelligence (AI), including those existing processes on premises involving legacy technologies.

The present techniques identify key phases of the migration process, fully assess current state, architecture and building blocks, and determine future state architecture, considering cloud-agnostic and open source targets, taking into account the customer's preferences regarding computing targets and heterogeneous service types. The present techniques may generate knowledge engines using ML, and execute the knowledge engines to determine a turnkey environment and/or step-by-step instructions for the customer, wherein the ML-based recommendations are updated over time (e.g., as new services are released).

The present techniques enable AI and ML-based based decision making for multi-cloud, hybrid cloud and cloud agnostic data and technology deliveries and transformations across Infrastructure-as-a-Service (Iaas), Platform-as-a-Service (PaaS), Software-as-a-Service (SaaS), etc. The present techniques may enable a warehouse of modularized data and technology building blocks that are continuously updated and improved via cloud-native or cloud agnostic or open source services and packages driving data enablement. The present techniques may also have a central knowledge engine ingesting data from multiple data sources (intellectual property, videos, blogs, news etc.) enabling federation of knowledge at optimal cost. The present techniques may include multiple ML-based knowledge engines that make recommendations on the right blend of on premise, cloud agnostic, and multi-cloud native modules required for efficient and innovative data and tech solution delivery/transformation, accelerating time to market, improving economics and significantly reducing risk through automation.

Exemplary Computing Environment

Figure 1:
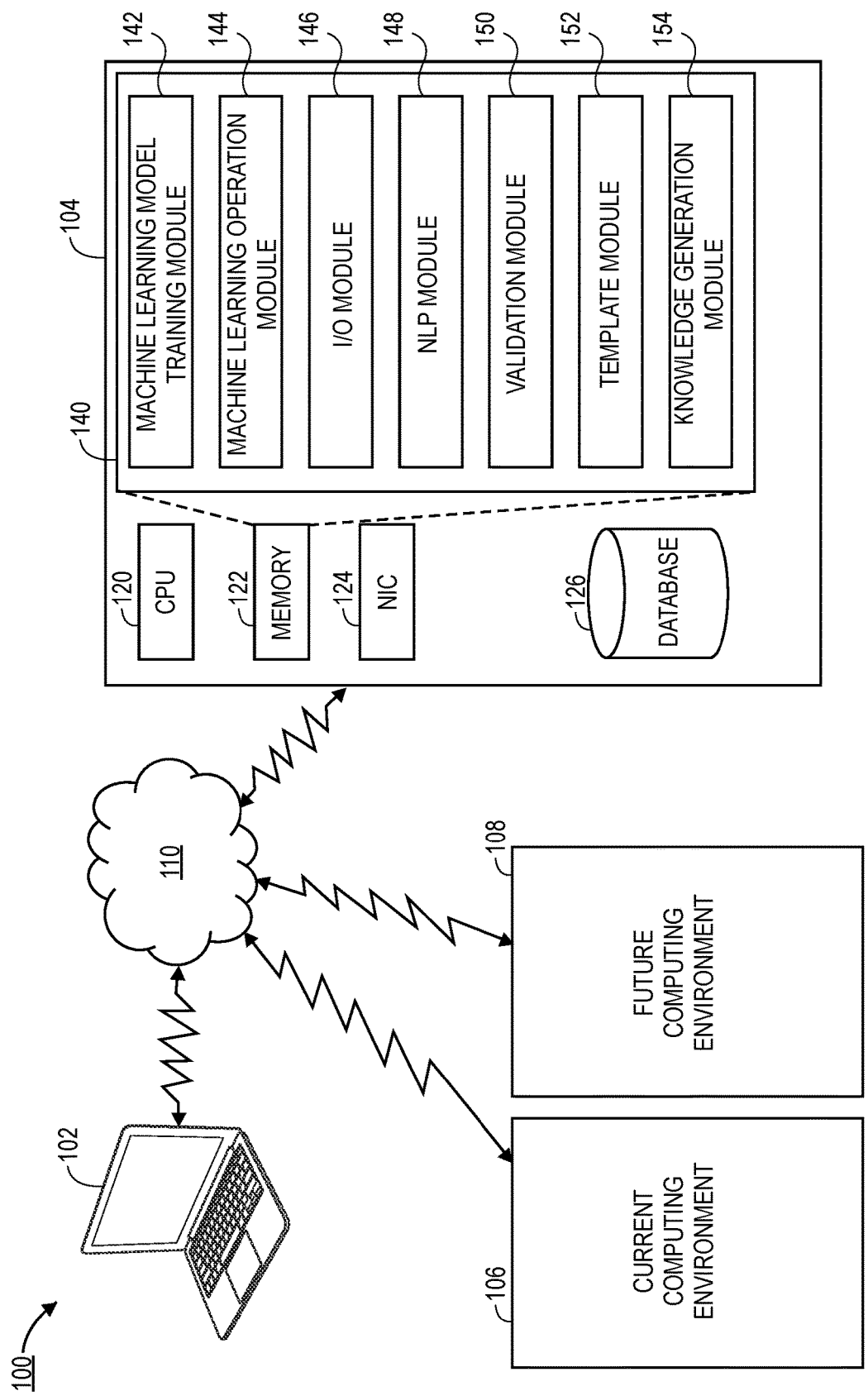
FIG. 1 depicts an exemplary computing environment in which environmental discovery, environmental validation and automated knowledge engine generation may be performed, in some aspects.

FIG. 1 depicts a computing environment 100 in which environmental discovery, environmental validation and automated knowledge engine generation may be performed, in accordance with various aspects discussed herein.

In the example aspect of FIG. 1, computing environment 100 includes client(s) 102, which may comprise one or more computers. In various aspects, client(s) 102 comprise multiple computers, which may comprise multiple, redundant, or replicated client computers accessed by one or more users. The example aspect of FIG. 1 further includes one or more servers 104 that may include one or more servers. In further aspects, the servers 104 may be implemented as cloud-based servers, such as a cloud-based computing platform. For example, servers 104 may be any one or more cloud-based platform(s) such as MICROSOFT AZURE, AMAZON AWS, Terraform, etc. The environment 100 may further include a current computing environment 106, representing a current computing environment (e.g., on premises) of a customer and/or future computing environment 108, representing a future computing environment (e.g., a cloud computing environment, multi-cloud environment, etc.) of a customer. The environment 100 may further include an electronic network 100 communicatively coupling other aspects of the environment 100.

As described herein, in some aspects, servers 104 may perform the functionalities as discussed herein as part of a "cloud" network or may otherwise communicate with other hardware or software components within one or more cloud computing environments to send, retrieve, or otherwise analyze data or information described herein. For example, in aspects of the present techniques, the current computing environment 106 may comprise a customer on-premise computing environment, a multi-cloud computing environment, a public cloud computing environment, a private cloud computing environment, and/or a hybrid cloud computing environment. For example, the customer may host one or more services in a public cloud computing environment (e.g., Alibaba Cloud, Amazon Web Services (AWS), Google Cloud, IBM Cloud, Microsoft Azure, etc.). The public cloud computing environment may be a traditional off-premise cloud (i.e., not physically hosted at a location owned/controlled by the customer). Alternatively, or in addition, aspects of the public cloud may be hosted on-premise at a location owned/controlled by the customer. The public cloud may be partitioned using visualization and multi-tenancy techniques, and may include one or more of the customer's IaaS and/or PaaS services.

In some aspects of the present techniques, the current computing environment 106 of the customer may comprise a private cloud that includes one or more cloud computing resources (e.g., one or more servers, one or more databases, one or more virtual machines, etc.) dedicated to the customer's exclusive use. In some aspects, the private cloud may be distinguished by its isolation to hardware exclusive to the customer's use. The private clouds may be located on-premise of the customer, or constructed from off-premise cloud computing resources (e.g., cloud computing resources located in a remote data center). The private clouds may be third-party managed and/or dedicated clouds.

In still further aspects of the present techniques, the current computing environment 106 may comprise a hybrid cloud that includes multiple cloud computing environments communicatively coupled via one or more networks (e.g., the network 110). For example, in a hybrid cloud computing aspect, the current computing environment 106 may include one or more private clouds, one or more public clouds, a bare-metal (e.g., non-cloud based) system, etc. The future computing environment 108 may comprise one or more public clouds, one or more private clouds, one or more bare-metal systems/servers, and/or one or more hybrid clouds. The servers 104 may be implemented as one or more public clouds, one or more private clouds, one or more hybrid clouds, and/or one or more bare-metal systems/servers. For example, the servers 104 may be implemented as a private cloud computing environment that orchestrates the migration of a current computing environment 106 implemented as a first hybrid cloud (e.g., comprising two public clouds and three private clouds) to a future computing environment 108 implemented as a second hybrid cloud (e.g., comprising one public cloud and five private clouds).

The client device 102 may be any suitable device (e.g., a laptop, a smart phone, a tablet, a wearable device, a blade server, etc.). The client device 102 may include a memory and a processor for, respectively, storing and executing one or more modules. The memory may include one or more suitable storage media such as a magnetic storage device, a solid-state drive, random access memory (RAM), etc. A proprietor of migration techniques may access the environment 100 via the client device 102, to access services or other components of the environment 100 via the network 110.

The network 110 may comprise any suitable network or networks, including a local area network (LAN), wide area network (WAN), Internet, or combination thereof. For example, the network 106 may include a wireless cellular service (e.g., 4G). Generally, the network 110 enables bidirectional communication between the client device 102 and the servers 104; the servers 104 and the current computing environment 106; the servers 104 and the future computing environment 108, etc. As shown in FIG. 1, servers 104 are communicatively connected, via computer network 110 to the one or more computing environments 106 and 108 via network 110. In some aspects, network 110 may comprise a cellular base station, such as cell tower(s), communicating to the one or more components of the environment 100 via wired/wireless communications based on any one or more of various mobile phone standards, including NMT, GSM, CDMA, UMMTS, LTE, 5G, or the like. Additionally or alternatively, network 110 may comprise one or more routers, wireless switches, or other such wireless connection points communicating to the components of the environment 100 via wireless communications based on any one or more of various wireless standards, including by non-limiting example, IEEE 802.11a/b/c/g (WIFI), the BLUETOOTH standard, or the like.

The one or more servers 104 may include one or more processors 120, one or more computer memories 122, one or more network interface controllers (NICs) 124 and an electronic database 126. The NIC 124 may include any suitable network interface controller(s), and may communicate over the network 110 via any suitable wired and/or wireless connection. The servers 104 may include one or more input device (not depicted) and may include one or more device for allowing a user to enter inputs (e.g., data) into the servers 104. For example, the input device may include a keyboard, a mouse, a microphone, a camera, etc. The NIC may include one or more transceivers (e.g., WWAN, WLAN, and/or WPAN transceivers) functioning in accordance with IEEE standards, 3GPP standards, or other standards, and that may be used in receipt and transmission of data via external/network ports connected to computer network 110.

The database 126 may be a relational database, such as Oracle, DB2, MySQL, a NoSQL based database, such as MongoDB, or another suitable database. The database 126 may store data used to train and/or operate one or more ML/AI models. The database 126 may store runtime data (e.g., a customer response received via the network 110). In various aspects, server(s) 104 may be referred to herein as "migration server(s)." The servers 104 may implement client-server platform technology that may interact, via the computer bus, with the memory(s) 122 (including the applications(s), component(s), API(s), data, etc. stored therein) and/or database 126 to implement or perform the machine readable instructions, methods, processes, elements or limitations, as illustrated, depicted, or described for the various flowcharts, illustrations, diagrams, figures, and/or other disclosure herein.

The processor 120 may include one or more suitable processors (e.g., central processing units (CPUs) and/or graphics processing units (GPUs)). The processor 120 may be connected to the memory 122 via a computer bus (not depicted) responsible for transmitting electronic data, data packets, or otherwise electronic signals to and from the processor 120 and memory 122 in order to implement or perform the machine readable instructions, methods, processes, elements or limitations, as illustrated, depicted, or described for the various flowcharts, illustrations, diagrams, figures, and/or other disclosure herein. The processor 120 may interface with the memory 122 via a computer bus to execute an operating system (OS) and/or computing instructions contained therein, and/or to access other services/aspects. For example, the processor 120 may interface with the memory 122 via the computer bus to create, read, update, delete, or otherwise access or interact with the data stored in memory 122 and/or the database 126.

The memory 122 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memory 122 may store an operating system (OS) (e.g., Microsoft Windows, Linux, UNIX, etc.) capable of facilitating the functionalities, apps, methods, or other software as discussed herein.

The memory 122 may store a plurality of computing modules 140, implemented as respective sets of computer-executable instructions (e.g., one or more source code libraries, trained machine learning models such as neural networks, convolutional neural networks, etc.) as described herein.

In general, a computer program or computer based product, application, or code (e.g., the model(s), such as machine learning models, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 120 (e.g., working in connection with the respective operating system in memory 122) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C #, Objective-C, Java, Scala, ActionScript, JavaScript, HTML, CSS, XML, etc.).

For example, in some aspects, the computing modules 140 may include a ML model training module 142, comprising a set of computer-executable instructions implementing machine learning training, configuration, parameterization and/or storage functionality. The ML model training module 142 may initialize, train and/or store one or more ML knowledge engines, as discussed herein. The ML knowledge engines, or "engines" may be stored in the database 126, which is accessible or otherwise communicatively coupled to the servers 104. The modules 140 may store machine readable instructions, including one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, an environmental discovery, validation and automatic knowledge generation machine learning model or system.

The ML training module 142 may train one or more ML models (e.g., an artificial neural network). One or more training data sets may be used for model training in the present techniques, as discussed herein. The input data may have a particular shape that may affect the ANN network architecture. The elements of the training data set may comprise tensors scaled to small values (e.g., in the range of (−1.0, 1.0)). In some aspects, a preprocessing layer may be included in training (and operation) which applies principal component analysis (PCA) or another technique to the input data. PCA or another dimensionality reduction technique may be applied during training to reduce dimensionality from a high number to a relatively smaller number. Reducing dimensionality may result in a substantial reduction in computational resources (e.g., memory and CPU cycles) required to train and/or analyze the input data.

In general, training an ANN may include establishing a network architecture, or topology, adding layers including activation functions for each layer (e.g., a "leaky" rectified linear unit (ReLU), softmax, hyperbolic tangent, etc.), loss function, and optimizer. In an aspect, the ANN may use different activation functions at each layer, or as between hidden layers and the output layer. A suitable optimizer may include Adam and Nadam optimizers. In an aspect, a different neural network type may be chosen (e.g., a recurrent neural network, a deep learning neural network, etc.). Training data may be divided into training, validation, and testing data. For example, 20% of the training data set may be held back for later validation and/or testing. In that example, 80% of the training data set may be used for training. In that example, the training data set data may be shuffled before being so divided. Data input to the artificial neural network may be encoded in an N-dimensional tensor, array, matrix, and/or other suitable data structure. In some aspects, training may be performed by successive evaluation (e.g., looping)

of the network, using training labeled training samples. The process of training the ANN may cause weights, or parameters, of the ANN to be created. The weights may be initialized to random values. The weights may be adjusted as the network is successively trained, by using one of several gradient descent algorithms, to reduce loss and to cause the values output by the network to converge to expected, or "learned", values. In an aspect, a regression may be used which has no activation function. Therein, input data may be normalized by mean centering, and a mean squared error loss function may be used, in addition to mean absolute error, to determine the appropriate loss as well as to quantify the accuracy of the outputs.

Figure 6A:
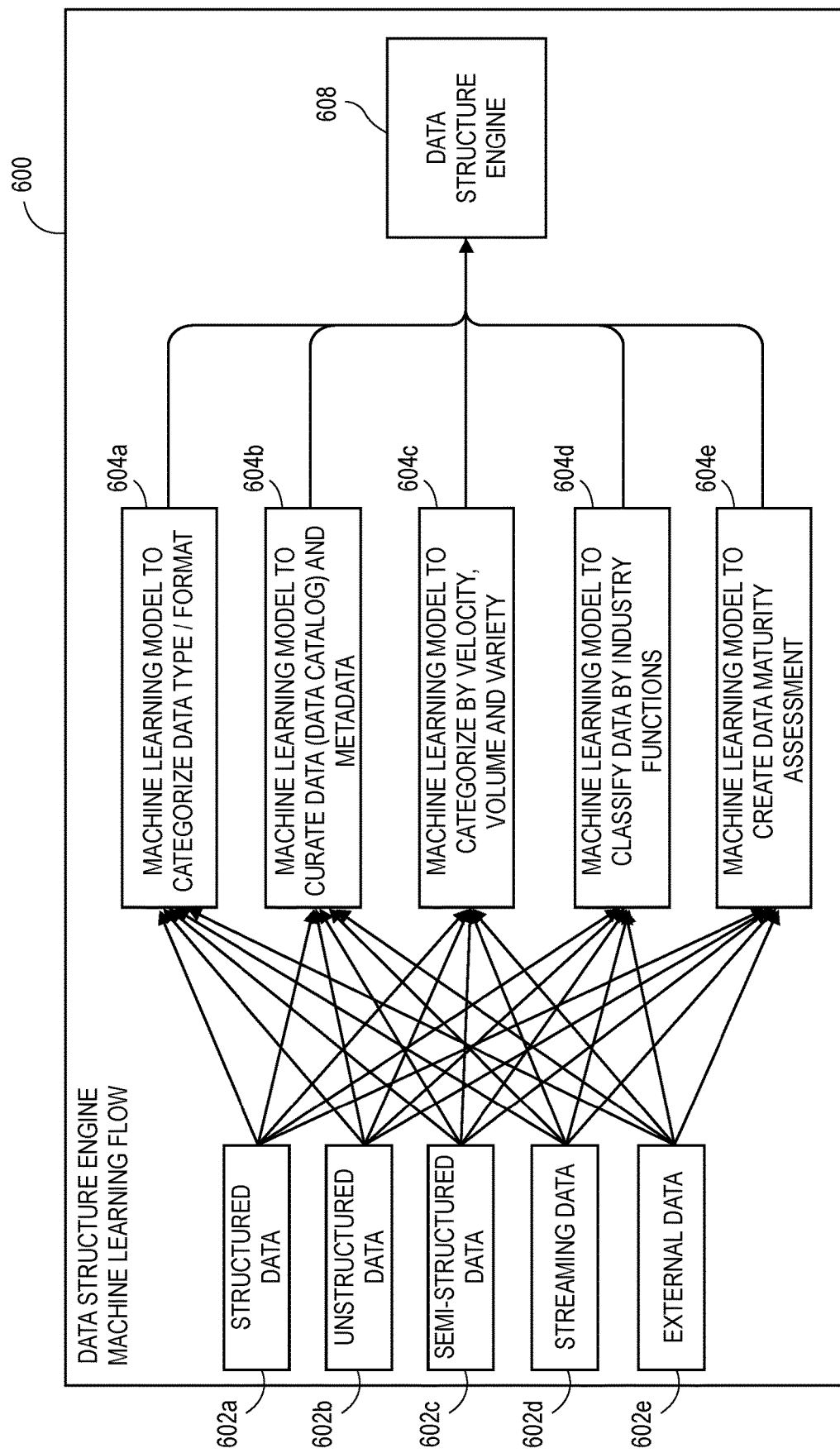
FIG. 6A is an exemplary block flow diagram depicting a computer-implemented method for generating one or more data structure engines using machine learning, according to an aspect.
Figure 6B:
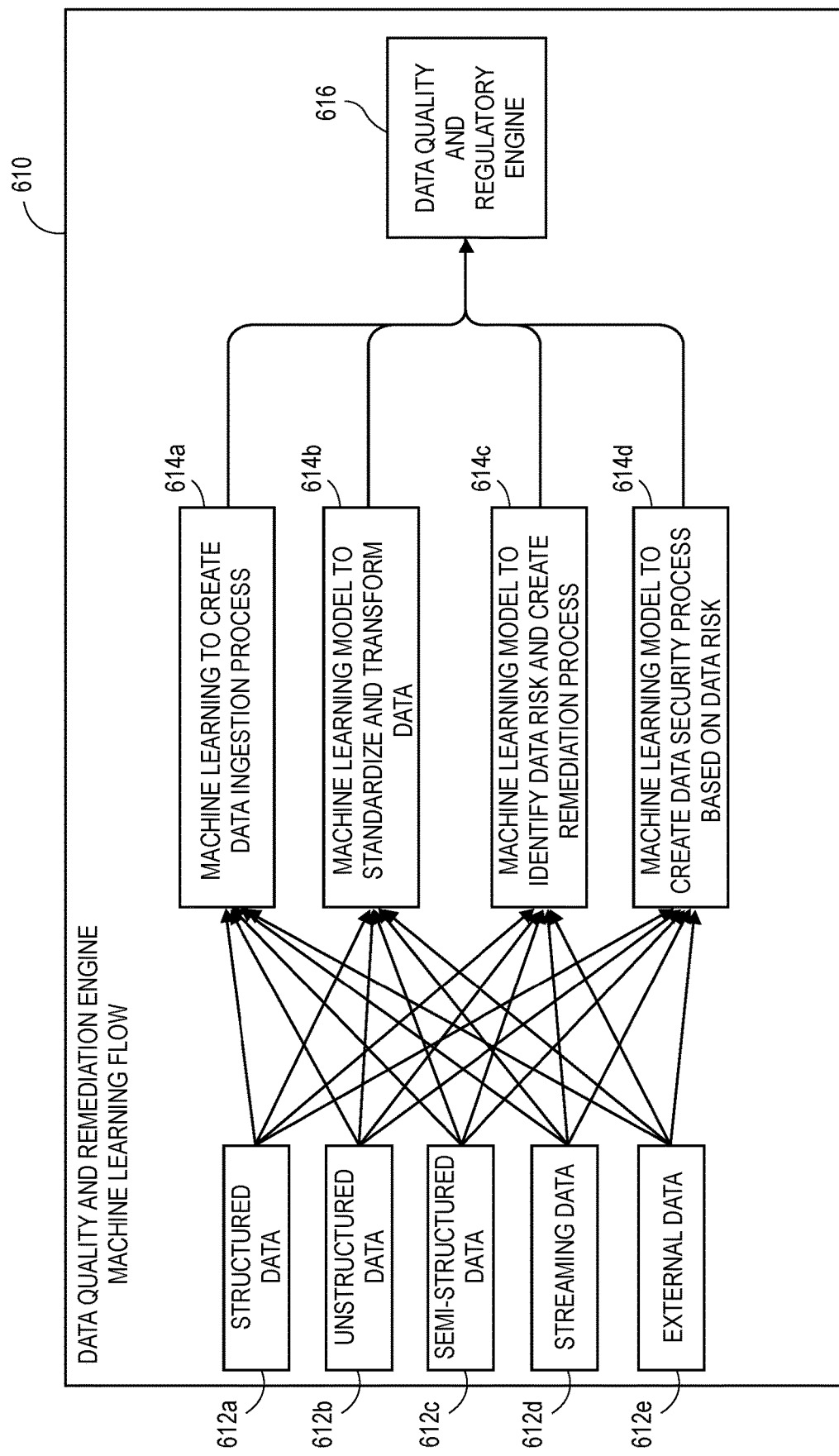
FIG. 6B is an exemplary block flow diagram depicting a computer-implemented method for generating one or more data quality and regulatory engines using machine learning, according to an aspect.
Figure 6C:
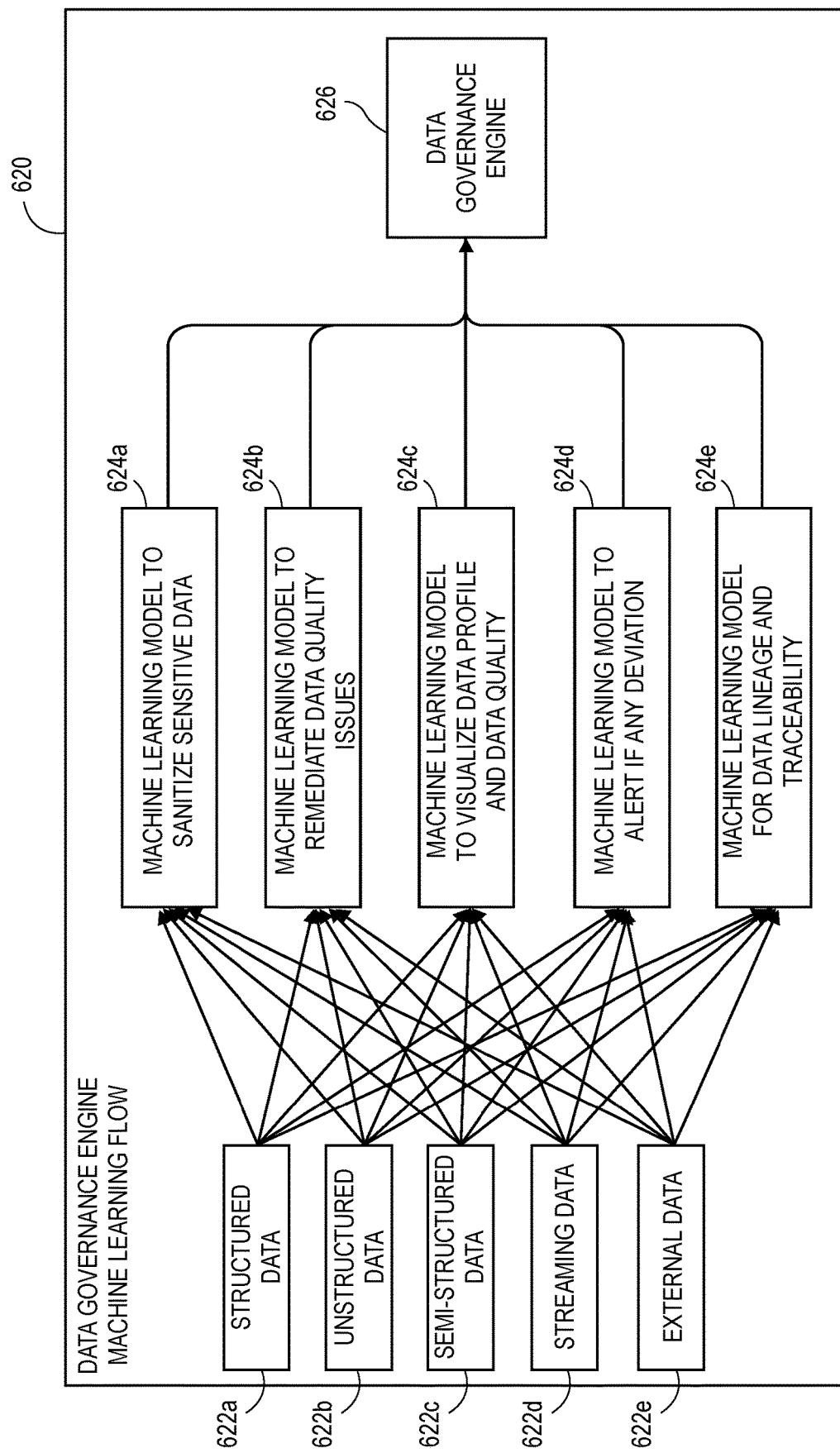
FIG. 6C is an exemplary block flow diagram depicting a computer-implemented method for generating one or more data governance engines using machine learning, according to an aspect.

The ML training module 142 may receive labeled data at an input layer of a model having a networked layer architecture (e.g., an artificial neural network, a convolutional neural network, etc.) for training the one or more ML models to generate ML models (e.g., the ML model at blocks 624 of FIG. 6C). The received data may be propagated through one or more connected deep layers of the ML model to establish weights of one or more nodes, or neurons, of the respective layers. Initially, the weights may be initialized to random values, and one or more suitable activation functions may be chosen for the training process, as will be appreciated by those of ordinary skill in the art. The method may include training a respective output layer of the one or more machine learning models. The output layer may be trained to output a prediction, for example.

The data used to train the ANN may include heterogeneous data (e.g., textual data, image data, audio data, etc.). In some aspects, multiple ANNs may be separately trained and/or operated. In some aspects, the present techniques may include using a machine learning framework (e.g., TensorFlow, Keras, scikit-learn, etc.) to facilitate the training and/or operation of machine learning models.

In various aspects, an ML model, as described herein, may be trained using a supervised or unsupervised machine learning program or algorithm. The machine learning program or algorithm may employ a neural network, which may be a convolutional neural network, a deep learning neural network, or a combined learning module or program that learns in two or more features or feature datasets (e.g., structured data, unstructured data, etc.) in a particular areas of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques. In some aspects, the artificial intelligence and/or machine learning based algorithms may be included as a library or package executed on server(s) 104. For example, libraries may include the TensorFlow based library, the Pytorch library, and/or the scikit-learn Python library.

Machine learning may involve identifying and recognizing patterns in existing data (such as data risk issues, data quality issues, sensitive data, etc.) in order to facilitate making predictions, classifications, and/or identifications for subsequent data (such as using the models to determine or generate a classification or prediction for, or associated with, applying a data governance engine to train a descriptive analytics model).

Machine learning model(s), may be created and trained based upon example data (e.g., "training data") inputs or data (which may be termed "features" and "labels") in order to make valid and reliable predictions for new inputs, such as testing level or production level data or inputs. In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, computing device, or otherwise processor(s), to predict, based on the discovered rules, relationships, or model, an expected output.

In unsupervised machine learning, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated.

Supervised learning and/or unsupervised machine learning may also comprise retraining, relearning, or otherwise updating models with new, or different, information, which may include information received, ingested, generated, or otherwise used over time. The disclosures herein may use one or both of such supervised or unsupervised machine learning techniques.

In various aspects, training the ML models herein may include generating an ensemble model comprising multiple models or sub-models, comprising models trained by the same and/or different AI algorithms, as described herein, and that are configured to operate together. For example, in some aspects, each model may be trained to identify or predict diagnostic analytics, where each model may output or determine a classification for a computing environment such that a given environment may be identified, assigned, determined, or classified with one or more environment classifications.

In some aspects, the computing modules 140 may include a machine learning operation module 144, comprising a set of computer-executable instructions implementing machine learning loading, configuration, initialization and/or operation functionality. The ML operation module 144 may include instructions for storing trained models (e.g., in the electronic database 126, as a pickled binary, etc.). Once trained, the one or more trained ML models may be operated in inference mode, whereupon when provided with de novo input that the model has not previously been provided, the model may output one or more predictions, classifications, etc. as described herein.

The architecture of the ML model training module 142 and the ML operation module 144 as separate modules represent advantageous improvements over the prior art. In conventional computing systems that include multiple machine learning algorithms, for performing various functions, the models are often added to each individual module or set of instructions independent from other algorithms/modules. This is wasteful of storage resources, resulting in significant code duplication. Further, repeating ML model storage in this way may result in retraining of the same model aspects in multiple places, wasting computational resources. By consolidating ML model training and ML model operation into two respective modules that may be reused by any of the various ML algorithms/ modeling suites of the present techniques, waste of storage and computation is avoided. Further, this organization enables training jobs to be organized by a task scheduling module (not depicted), for efficiently allocating computing resources for training and operation, to avoid overloading the underlying system hardware, and to enable training to be performed using distributed computing resources (e.g., via the network 110) and/or using parallel computing strategies.

In some aspects, the computing modules 140 may include an input/output (I/O) module 146, comprising a set of computer-executable instructions implementing communication functions. The I/O module 146 may include a communication component configured to communicate (e.g., send and receive) data via one or more external/network port(s) to one or more networks or local terminals, such as computer network 110 and/or the client 102 (for rendering or visualizing) described herein. In some aspects, servers 104 may include a client-server platform technology such as ASP.NET, Java J2EE, Ruby on Rails, Node.js, a web service or online API, responsive for receiving and responding to electronic requests.

I/O module 146 may further include or implement an operator interface configured to present information to an administrator or operator and/or receive inputs from the administrator and/or operator. An operator interface may provide a display screen (e.g., via the terminal 109). I/O module 146 may facilitate I/O components (e.g., ports, capacitive or resistive touch sensitive input panels, keys, buttons, lights, LEDs), which may be directly accessible via, or attached to, servers 104 or may be indirectly accessible via or attached to the client device 102. According to some aspects, an administrator or operator may access the servers 104 via the client device 102 to review information, make changes, input training data, initiate training via the ML training module 142, and/or perform other functions (e.g., operation of one or more trained models via the ML operation module 144).

In some aspects, the computing modules 140 may include a natural language processing (NLP) module 148, comprising a set of computer-executable instructions implementing natural language processing functionality.

In some aspects, the computing modules 140 may include a validation module 150, comprising a set of computer-executable instructions implementing environmental discovery and/or environmental validation, functionality. The validation module 150 may include a set of computer-implemented functionality (e.g., one or more scripts) that determine the acceleration and readiness of an existing computing system (e.g., the current computing environment 106). For example, the validation module 150 may analyze the memory footprint of an operating system executing in the current computing environment 106, such as the services executing therein. For example, the validation module 150 may collect the amount of memory consumed, version of software, etc. The validation module 150 may include a set of instructions for training one or more machine learning model to evaluate input (e.g., an electronic template form describing a future computing environment) for validity, by analyzing one or more historical labeled inputs (e.g., a plurality of electronic template forms labeled as valid/invalid). The validation module 150 may access codified knowledge for training the one or more ML model. For example, the proprietor of the present techniques may prepare a codified data set that includes disconnected components (e.g., a component 100 and a component 103, without a connecting component 102). The validation module 150 may be provided with the codified data set, wherein the examples are labeled according to whether a component is lacking. The validation module 150 may thereby train the one or more ML models to identify electronic template forms that include disconnected components. Based on the output of the validation module 150, the validation module 150 may generate one or more questions for the customer (e.g., is this the connection you are looking for?). A yes/no answer may be collected from the customer (e.g., via the I/O module 146) in a guided questionnaire aspect, as discussed herein.

In some aspects, the computing modules 140 may include a template module 152, comprising a set of computer-executable instructions implementing templating functionality. The template module 152 may generate one or more electronic template forms, which are electronic objects including a plurality of fields describing a computing environment (e.g., the current computing environment 106, the future computing environment 108, etc.). The electronic template forms may be used to describe the contents of an existing customer computing environment, for example, and to describe a non-existent but planned future computing environment. The electronic template form may comprise computer-executable code that can be evaluated by a graphical user interface (e.g., a web browser) to provide a user with a quick and intuitive understanding of a computing environment. For example, components of the computing environment may be displayed using a nested hierarchical view (e.g., a tree view), using a flat list, using an interactive object-based view, etc.

In some aspects, the computing modules 140 may include a knowledge generation module 154, comprising a set of computer-executable instructions implementing knowledge generation functionality. The knowledge generation module may include instructions for accessing and analyzing data from various sources (e.g., structure data, unstructured data, semi-structured data, streaming data, data external to the computing environment 100, etc.) and training one or more ML models based on the accessed data to generate one or more knowledge engines that may be one or more composite ML model, in some aspects.

Exemplary High-Level System Flow

Figure 2:
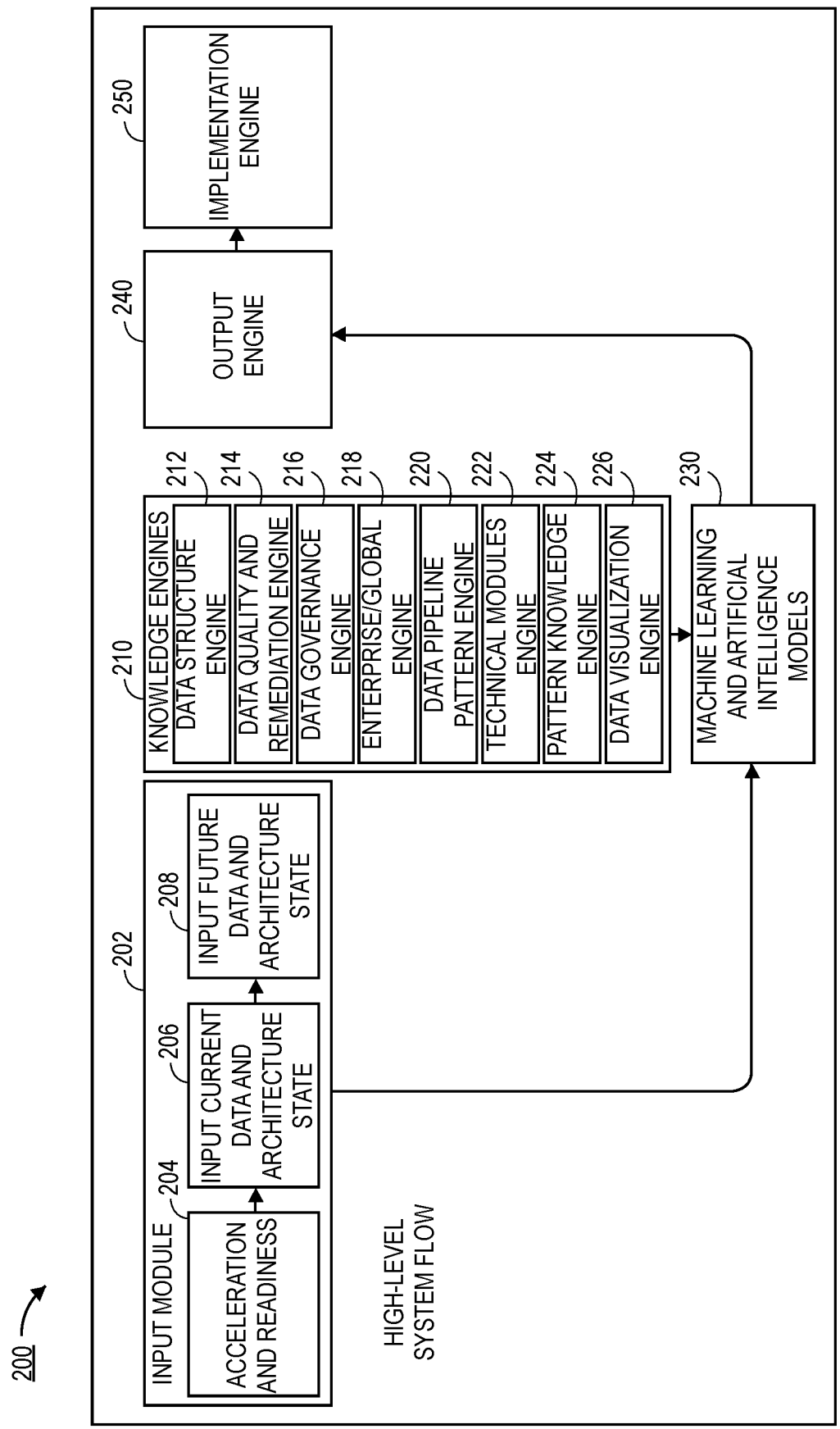
FIG. 2 is an exemplary block flow diagram depicting a computer-implemented method performing environmental discovery, environmental validation and automated knowledge engine generation, according to some aspects.

FIG. 2 is an exemplary block flow diagram depicting a computer-implemented method 200 performing environmental discovery, environmental validation and automated knowledge engine generation, according to some aspects. In block 202, acceleration and readiness system 204 loads pre-built templates, and scan existing architecture/infrastructure (e.g., the current computing environment 106 of FIG. 1) to collect information to provide full view into the current state of a customer's computing environment. For example, the acceleration and readiness system 204 is implemented by the validation module 150 of the modules 140. The acceleration and readiness module 204 may extract and store current state information.

The method 200 contributes to an intelligent decision making model for efficient and effective cloud delivery and cloud transformations. In general, the present techniques may be used to determine the current state of a computing environment (e.g., the computing environment 106) and to determine one or more future state of a computing environment (e.g., the future computing environment 108). The present techniques improves migration technology by making solution discovery simple and nimble. For example, the acceleration and readiness system 204 may include pre-built electronic templates, and instructions for scanning existing architecture/infrastructure to collect information to provide a full view into the current computing environment state. For example, the acceleration and readiness module 204 may include instructions for processing architecture and infrastructure diagrams to extract information. The acceleration and readiness system may identify whether information is complete by reference to codified knowledge, organizes data based on source, and uses ML to ensure that information in electronic template forms is completed and any gaps in the architecture identified, and in some aspects, recommending and receiving confirmation of changes from the customer.

The acceleration and readiness system 204 is described in further detail, below, with respect to FIG. 3.

Block 202 may include a current data and architecture state system 206 in some aspects. In some cases, customers may be unwilling and/or unable to share all current computing environment information. In that case, the current data and architecture state system 206 may receive, from the customer, a manually-completed template electronic form (e.g., completed by a subject matter expert) describing the current computing environment 106. The system 206 may analyze the received template to ensure that the template reflects comprehensive architectures/complex multiple internal/external layers of the current computing environment, essentially ensuring that full end-to-end integrity/connectivity/interoperability of the customer's current computing environment is captured in electronic form. The system 206 is described in further detail below, with respect to FIG. 4.

Block 202 may include a future data and architecture state system 208. System 208 may receive customers/client feedback regarding a future state of the customer's computing environment (e.g., the future computing environment 108). In some cases, the customer may provide feedback regarding desired aspects of the future computing environment 108 (e.g., cost, time to market, flexibility, scalability, etc.). In some aspects, the customer may state a default preference (e.g., we don't care, give us the best mix of features). The system 208 may receive customer preferences as to the technological composition of the future computing environment 108, including whether the customer desires a single cloud environment, a multiple-cloud (i.e., multi-cloud) environment comprising a plurality of cloud providers/subsystem, a hybrid cloud, etc.

The method 200 may further include generating knowledge engines at block 210. For example, the knowledge engines may include a data structure engine 212, a data quality and remediation engine 214, a data governance engine 216, a global data/enterprise engine 218, a data pipeline pattern engine 220, a technical modules engine 222, a pattern knowledge engine 224; and a data visualization engine 226. Generation and use of each of the engines at block 210 is described in further detail, below, with respect to FIGS. 6A-6H, below. More or fewer knowledge engines may be included in some aspects. The block 210 may be considered a collector and generator of knowledge engines (i.e., building blocks belonging to one or more process). The knowledge engines at block 210 may be thought of as a central warehouse of building blocks that are continuously improved and updated from various types of data, various internal information (e.g., proprietary knowledge, engineering talent, etc.) as well as external data sources (e.g., blogs, videos, news, etc.). Additionally, the knowledge engines at block 210 leverage built-in knowledge powered from multiple data sources with near real-time data pipelines to build the warehouse of reusable building blocks. The knowledge data pipelines are beneficial for keeping knowledge up to date and aligned with the latest technology trends.

At block 210, the method 200 uses ML to categorize, curate and provide data types, data velocity, classification of data in industry, maturity of data (proprietary, internal data), etc. The method 200 may capture disparate types of data (e.g., structure, semi-structured, etc.) and codify the data. The codification process may translate any data to ML data (e.g., tensors) to use the data as inputs for predictions (e.g., for best future states). It will be appreciated by those of ordinary skill in the art that the method 200 performs complex analyses that conventionally require significant numbers of high skilled employees (e.g., engineers).

Generally, generating the knowledge engines includes collecting and codifying domain knowledge using ML, and using that knowledge as input for training further one or more ML models. The respective outputs of the knowledge engines at block 210 may be provided to block 230. The training and operation of the knowledge engines at block 210 may be performed by the knowledge generation module 154 of FIG. 1, using, for example, the ML model training module 142 and/or the ML operation module 144 of FIG. 1. At block 210, the knowledge modules may be periodically recomputed.

The method 200 may proceed, at block 230, to analyze the information determined and received at block 202 and/or block 210, using one or more ML and/or AI models, as further described with respect to FIGS. 8A-8E, below. The ML model operation and training at block 230 may be performed by, for example, one or more modules 140 of FIG. 1 using, for example, the ML model training module 142 and/or the ML operation module 144 of FIG. 1.

Generally, block 230 leverages the reusable data and technology building blocks and knowledge engine components to recommend the best blend of building blocks to stitch together for a proficient on premise, cloud, or hybrid delivery and transformation. The method 200 may use block 230 to periodically assess the economics of cloud technology solutions and recommend alternate options. The method 200 may continuously help promote innovation by pinpointing inefficiencies and recommending improvement to existing reusable building blocks considering cost efficiencies and time to market. The method 200 may collect user feedback and systematically incorporate it in future decisions and recommendations correcting any bias that may had been introduced in the system, and detect inefficiencies, triggering opportunities for developing new reusable building blocks to make the solution delivery process even more efficient and cost effective, perpetual innovation. The method 200 may be used to assess and recommend technical debt removal in existing environments (e.g., the current computing environment 106).

The output of the one or more ML and/or AI models at block 230 may be received at the output engine 240, and the method 200 may include processing outputs of the output engine 240 using an implementation engine at block 250. Generally, the output engine 240 may generate a detailed deployment template including detailed step by step documentation to deploy the future state architecture, and the implementation engine 250 can either be used by the user to implement manual deployment of the output components in the on-premise or multi-cloud environment or use the infrastructure as code ready-to-deploy pipelines which can automatically deploy the components based on a preferred target (e.g., on-premise or cloud platform).

Exemplary Computer-Implemented Method for Template Generation Machine Learning

Figure 3:
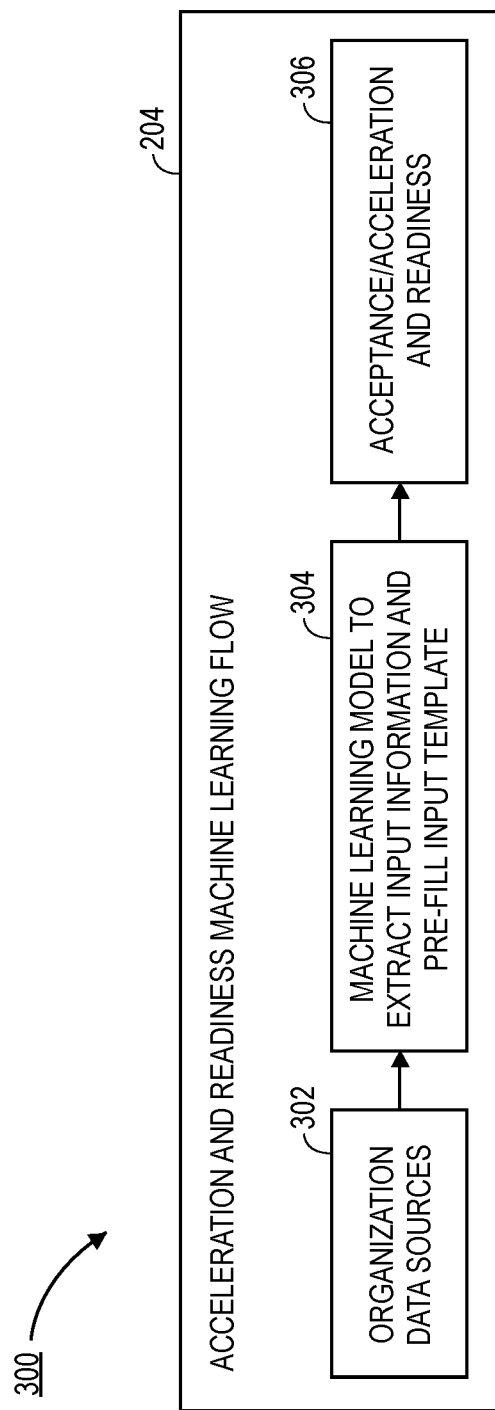
FIG. 3 is an exemplary block flow diagram depicting a computer-implemented method for performing machine learning training and operation, according to an aspect.

FIG. 3 is an exemplary block flow diagram depicting a computer-implemented method 300 for performing machine learning training and operation, according to an aspect. The method 300 may be implemented in code, for example, as a sub-routine performed by block 206 of FIG. 2. The method 300 includes, at block 204, training a machine learning model to extract input information. The input information may be retrieved from the database 126, for example. The training of method 300, at block 302 and at block 304, may be performed by the template module 152, for example, accessing the ML training module 142. The template module 152 may train one or more machine learning models to generate a pre-filled input template. The training data may comprise historical data include input information, describing historical current computing environments that are not necessarily those of the customer. The trained model may be configured by the method 300 to output a pre-filled template, that may be analyzed at acceleration and readiness block 306. The acceleration and readiness block 306 may correspond to the block 204 of FIG. 2, in some aspects.

The method 300 may include discovering one or more organization data sources. For example, the method 300 may include the validation module 150 scanning one or more services of the current computing environment 106 of the customer as described herein. Further, the method 300 may leverage organization data sources to pre-fill input data and architecture electronic template forms, as discussed herein. The ML model at block 304 may perform a proactive evaluation of current data and architecture landscape to extract information and fill in (i.e., parameterize) the input template.

Exemplary Computer-Implemented Method for Data & Architecture State Flow

Figure 4:
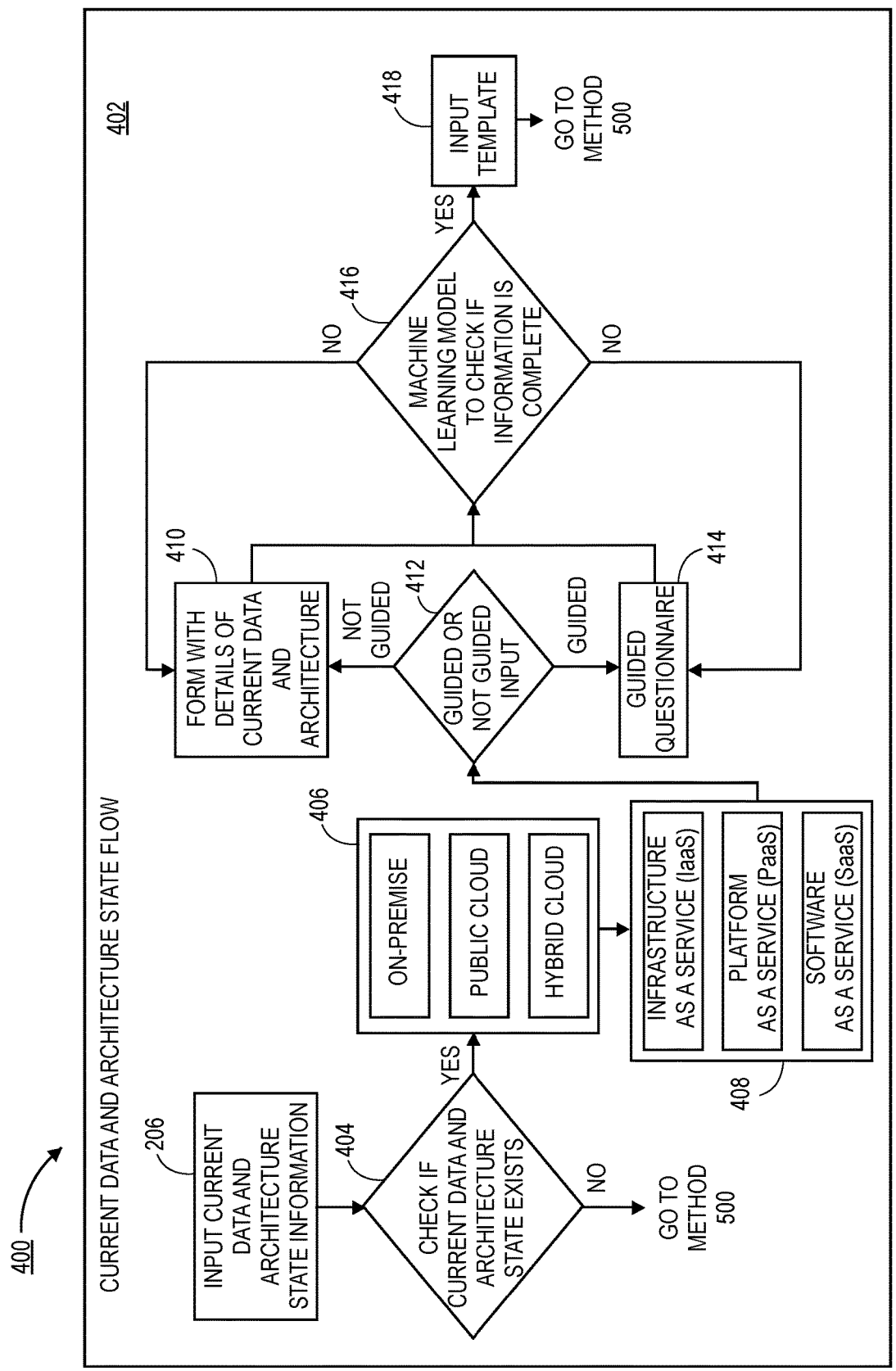
FIG. 4 is an exemplary block flow diagram depicting a computer-implemented method for collecting current architecture state information, validating current information, and generating input templates, according to an aspect.

FIG. 4 is an exemplary block flow diagram depicting a computer-implemented method 400 for collecting current architecture state information, validating current information, and generating input templates, according to an aspect. As described in FIG. 2, block 206 of the method 400 includes receiving current data and architecture state. The current data and architecture may be provided by a customer, or discovered as discussed. At block 404, the method 400 may include determining whether current data and architecture state exists. For example, the template module 152 may query the database 126, using a customer identifier and/or an identifier associated with the current computing environment 106, to determine whether the current data and architecture state exists. At block 404, when a current data and architecture state exists, the method 400 may determine an architecture configuration. For example, the method 400 may determine whether the current architecture is an on-premise architecture (i.e., at the customer premise), public cloud architecture and/or a hybrid cloud architecture. The method 400 may determine the current architecture by querying aspects of the current computing environment 106.

In some cases, one or more machine learning models may be used as discussed with respect to FIG. 3 to generate an input template. The customer's preferences with respect to computing target and service types may be collected and provided as input to the ML models at block 406 and 408, respectively. Specifically, the method 400 may select the one or or more ML models based on one or more computing target preferences expressed by the customer at block 406. For example, the customer may indicate (e.g., via the I/O module 146) that a public cloud target is desired at block 406. Based on this, the method 400 may select a pre-trained public cloud ML model for use at a later block (e.g., block 416). Other service targets may include hybrid cloud, multi cloud and/or on premise deployments.

At block 408, the method 400 may select one or more trained ML models based on different service type preferences (e.g., Iaas, PaaS, SaaS, etc.) expressed by the customer for the future computing environment 108. In some aspects, the customer's choices at block 406 may affect the availability of choices at block 408. For example, PaaS may be available for public and hybrid cloud targets, but not for an on-premise target.

At block 410, the method 400 may branch depending on whether the customer has selected (e.g., by the customer accessing the I/O module 146 via the client device 102) an unguided configuration procedure (block 412) or a guided configuration procedure (block 414).

At block 412, the method 400 may select the output of the machine learning model at block 304 (i.e., a template encoded as an electronic form). The method 400 may pass the output to a validation ML model at block 416. The validation ML model may have been trained, at an earlier time, by the validation module 150 of the one or more servers 104 to analyze the template electronic form to determine whether the template describes a valid future computing environment state, as discussed. In an unattended/unguided view, as at block 412, the block 416 may generate an input template electronic form 418 without interactive user feedback (i.e., as an entirely unattended computing process). In that case, a user choice ML model (e.g., trained by the template module 152) may answer questions that would be answered by the user in an attended or guided process, such as the one at block 414. The user choice ML may be trained using previous user answers to predict the most likely user responses to questions. For example, the template module 152 may access prior questions and answers related to missing connectors and, based on those answers, train the user choice ML model.

At block 414, for example, the I/O module 146 may transmit one or more configuration inquiries to the user via the network 110. For example, the customer may be using the client device 102 to receive the transmitted inquiries. The memory of the client device 102 may include a set of computer-executable instructions that receive the inquiries and display them in a graphical user interface, for example. The set of instructions in the client device 102 may collect the user's responses via an input device (e.g., a touchpad) and transmit the responses to each respective inquiry to the I/O module 146 via the network 110.

At block 416, the method 400 may include analyzing the customer's preferences with respect to computing target and service type to select one or more suitable pre-trained ML models for analyzing the template electronic form generated by the guided/unguided procedure, to determine the future computing environment state. The method 400 may operate the one or more selected ML models, providing the template electronic form as input, to generate a future state input template at block 418. The template electronic form may be repeatedly evaluated and modified, by control flowing back to block 412 or block 414 while the future state input template remains incomplete.

It should be appreciated that blocks 406 and 408 provide a high level of granularity and customizability, at the cost of requiring the customer to make choices about the future computing environment state. In some aspects, the blocks 406 and 408 may be omitted, wherein default preferences are substituted.

It should also be appreciated that once the input is generated, no current state may exist, because the customer does not have a current deployment. In that case, the method 400 may consider only future state, and not current state.

In some aspects, multiple versions of the method 400 may be deployed, wherein each one, instead of handling multiple service type preferences and/or computing targets, handles a single service type preference, or a single computing target. For example, a first method 400-a may handle multi-cloud Iaas, a second method 400-b may handle multi-cloud PaaS, etc. Dividing the method 400 in this way reduces coding complexity at the cost of higher storage space requirements.

Figure 5:
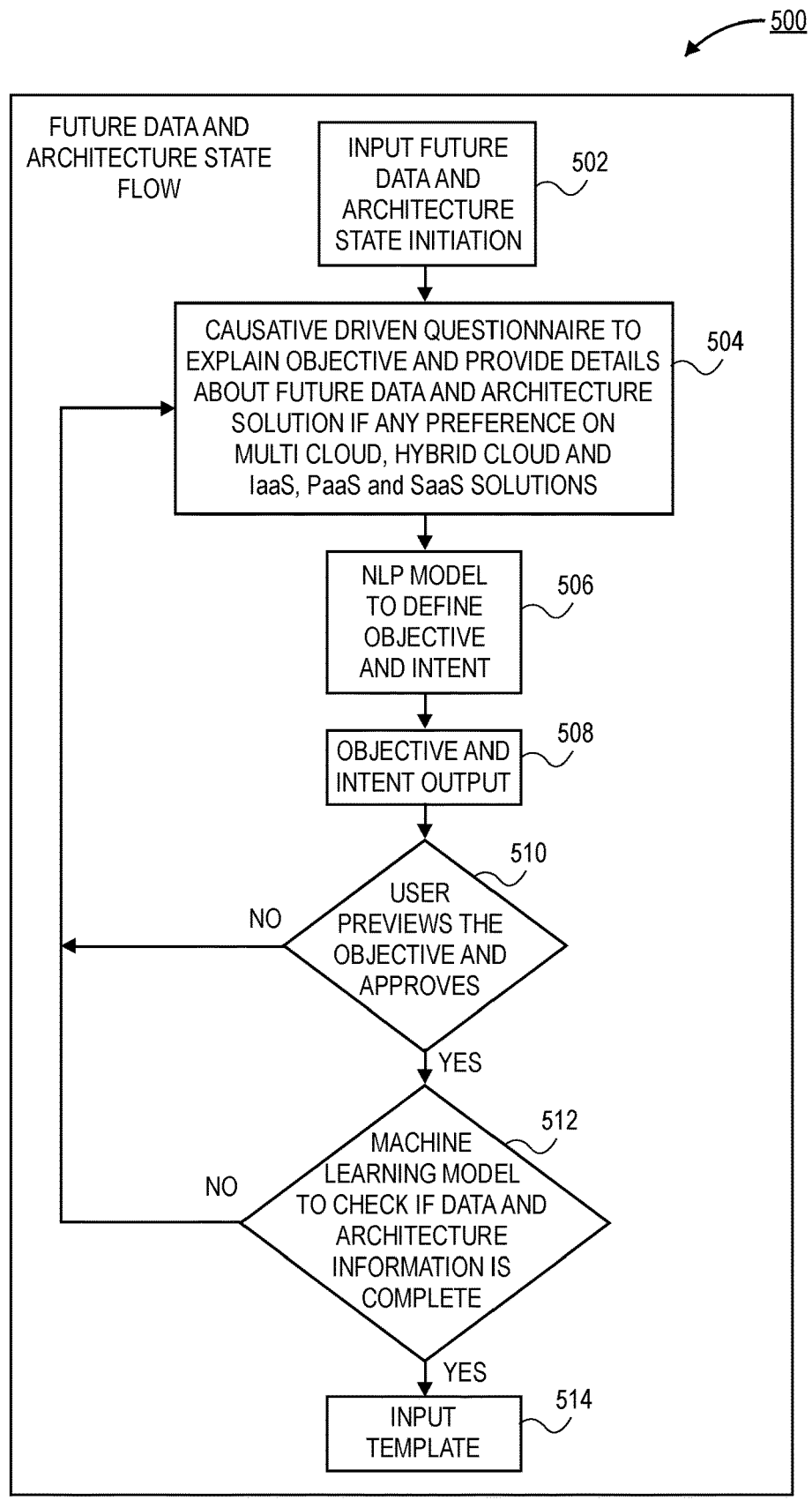
FIG. 5 is an exemplary block flow diagram depicting a computer-implemented method for analyzing future data and architecture state, collecting future state information, determining objectives and/or intents, generating/displaying previews, validating future state information and generating input templates, according to an aspect.

Furthermore, in still further aspects, the determination of computing target and service type preferences may be deferred and requested by the method 400 at a later stage (e.g., during an guided questionnaire at block 414), or determined using yet another pre-trained ML model (e.g., at block 412), or requested as part of a flow involving NLP, as depicted in FIG. 5.

Exemplary Computer-Implemented Natural Language Processing Methods

In general, NLP may be used in the present techniques to determine, and act upon, the meanings contained in human speech/utterances. For example, in some aspects, NLP may be used to provide pre-filled templates. An aspect of the present techniques may, for example, prompt a user (e.g., the customer) to describe a future state of a computing system (e.g., the user's description of the future computing environment 108). The present techniques may include instructions for determining specific general properties of the planned system (e.g., language related to cost, time to market, flexibility, scalability, etc.) and/or architectural considerations (e.g., one cloud, multiple clouds, hybrids of clouds, etc.). The present techniques may also include instructions for identifying noncommittal speech (e.g., "we don't care, just give us the best"). The present techniques may collect and codify user speech and use it as training data for one or more ML models, to predict what kind of solution architecture is the best considering past experience and knowledge of current and future state.

The NLP-based methods improve on conventional techniques, by enabling the present techniques to determine the future state of the customer's deployment by using ML to analyze input as data and knowledge from engineering work. The present techniques, as in the method 200, convert knowledge artifacts into codified numbers that may be ingested by one or more ML models, enabling the ML models to determine whether there is a complete view of the customer's architecture, and if not, to confirm missing gaps. The present techniques provide readiness and acceleration via templates and ML current state and future state, to determine that the customer's current environment is complete, to begin formalizing the state of the customer's future environment. If the data and architecture landscape is not complete, the ML model may identify gaps and provide recommendations that may be contingent on the client's confirmation.

The present technique currently cannot be performed by conventional systems unless a human is looking at components and evaluating the connectivity and feasibility of the solution, manually.

FIG. 5 is an exemplary block flow diagram depicting a computer-implemented method 500 for analyzing future data and architecture state, collecting future state information, determining objectives and/or intents, generating/displaying previews, validating future state information and generating input templates, according to an aspect.

At block 502, a template electronic form may be received and processed at block 504 using a causative-driven questionnaire, to determine the customer's objectives and provide details regarding the customer's desired future data and architecture solutions, including whether the customer has preferences regarding computing target(s) and service type(s). Whereas method 400 may require the customer to make an explicit selection from a pre-determined list of service types and/or deployment targets, the method 500 may include one or more pre-trained NLP models that are capable of determining a customer objective and/or intent. For example at block 506, use responses provided in the causative questionnaire at block 504 may be processed by the NLP module 148, for example. For example, the method 500 may receive natural language utterances, such as "give me a robust system that scales well." The trained NLP model may evaluate the customer's utterance to identify objectives. Continuing the example, objectives of "robustness" and "scalability" may be identified with high likelihood. Based on these objective indicia, the method 500 may generate an objective and intent output at 508. Further, the method 500 may display the objectives to the customer, along with an indication of confidence in each objective.

Generally, the questionnaire will embed causative decision making solutions which will help in decision making if the customer has a lack of understanding of the future environment state. Causative decision making may leverage principles of rational choice to create a more accurate and appropriate solution. The user's answers to the questionnaire may be fed into the NLP model that outputs detailed future data and architecture state details with granular intent and specifics of the request in a visual format. The customer has the ability to preview the detailed machine generated objectives and has the ability to either approve them or go back to explaining the objective via the detailed questionnaire. Once a detailed objective of the future data and architecture state are approved by the customer, a validation ML validates the future data and architecture state for accuracy and completeness to generate a detailed future data and architecture state input template. If the machine learning model validation check fails, the customer may be is directed back to the detailed questionnaire to re-explain their objective in the context of the failure error/s. If the data and architecture landscape is not complete, the ML model may identify gaps and provide recommendations contingent on the customer's confirmation.

Continuing the example, the NLP module 148 may, via the I/O module 146, transmit a message (e.g., an HTTP POST message) to the client computing device comprising a JavaScript Object Notation (JSON) payload including each identified objective and score. The client device 102 may parse and display the JSON to the user via a web page or other graphical user interface (not depicted). The client device 102 may collect a user indication of approval or disapproval via the graphical user interface. In the case that the customer does not approve, the method 500 may revert to block 504 and request further input from the customer. In the case that the customer approves, the method 500 may process the customer objectives using a pre-trained ML model. For example, the pre-trained ML model may correspond to the ML model at block 416 of FIG. 4.

Exemplary Machine Learning-Based Knowledge Engines

As discussed above, the present techniques may include initializing, training and/or storing one or more ML knowledge engines. The ML knowledge engines may be used, in some aspects, codify, or curate, information accessible to the proprietor of the present techniques. It will be appreciated by those of ordinary skill in the art that a mature consultancy or other business may possess large amounts of valuable data in different broad-based categories. Such institutional knowledge is advantageously encoded via the present techniques, and made available to downstream ML processes and systems, thereby improving machine learning training systems and techniques.

FIG. 6A is an exemplary block flow diagram depicting a computer-implemented method 600 for generating one or more data structure engines using machine learning, according to an aspect. At blocks 602a-602-e, the method 600 may include receiving/retrieving, in parallel, data from a plurality of sources, including structured data, unstructured data, semi-structured data, streaming data and external data. At blocks 604a-e, the data may be analyzed to train a plurality of machine learning models. For example, with reference to FIG. 1, the ML training module 142 may retrieve the data at blocks 602 from the database 126. At block 604a-e, the data may be processed (e.g., by the ML training module 142) to generate one or more trained models.

Specifically, at block 604a, the ML training module 142 may analyze the data from blocks 602 to train an ML model to categorize the data according to types and/or formats. For example, the mime type of the data may be determined. A trained ML model may be used to determine the type of data, e.g., by training the ML model using labeled historical data (e.g., a group of files labeled by type or format). At block 604b, the ML training module 142 may analyze the data to train an ML model to curate the data and to generate metadata. For example, the data may be an image blob that lacks exchangeable image file format (EXIF) metadata. Block 604b may include selecting a pre-trained machine learning model to generate metadata corresponding to the image blob by analyzing historical images that include EXIF metadata. Other types of file metadata may be generated, such as metadata information available via the stat system call. For further example, the ML training module 142 may analyze the data from blocks 602 at block 604c to train an ML model to categorize the data according to velocity, volume and/or variety. For example, the ML training module 142 may train the model to classify the data as "big data" if the data includes a large volume of data (e.g., 100 million records or more). The ML training module 142 may analyze the data from blocks 602 at block 604d to classify data according to industry function (e.g., as e-commerce, financial, healthcare, marketing, legal, etc.).

The ML models trained at blocks 604 are self-learning and extract critical information from different data sources, data types/formats. The method 600 may continuously ingest data from the various data sources 602, and feed the data into the various ML models of the blocks 604. The ML model the block 604 may categorize incoming data by data type or format. The ML model at block 604b may curate data in data catalog and generate metadata to get more information. The ML model at block 604c may categorize data by velocity, volume and variety and then as a next step, create a process to handle such data. For example, if high volume data is received, the ML model may create a process for big-data management. The ML model at block 604d may classify data by industry functions and then create process to manage cross functional data. The ML model at block 604e may create a data maturity assessment so that based on a data maturity score, downstream machine learning models can generate the processes to make the system secured and efficient. Data maturity may be measured according to the extent to which an organization is utilizing its data. To achieve a high level of data maturity, data must be deeply ingrained in the organization, and be fully incorporated into all decision making and practices. Data maturity is the journey towards improvement and increased capability in using data.

Once the method 600 trains individual models at blocks 604a-604e, the method 600 may combine the individually trained models into a data structure engine at block 608 composed of one or more of the models trained at blocks 604.

For example, the data structure engine 608 may be a single ML model (e.g., an artificial neural network model) having a plurality of input parameters, wherein each one corresponds to one of the blocks 604. De novo inputs may be provided to the blocks 604 to generate multiple outputs. In some aspects, the models trained at blocks 604 may be combined as multiple layers of a single ML model (e.g., of an artificial neural network). In that case, data may be passed to a first 1 . . . n layers corresponding to the model of block 604a, then to a second n+1 . . . m layers corresponding to the model of block 604b, and so on. Ultimately, the output of the layers may correspond to the output of the data structure engine at block 608. The particular combination of the ML models 604 may depend on aspects of the invention in practice. For example, the data structure engine 608 may form the basis of further ML models trained, for example, using ensemble techniques, transfer learning, and deep learning techniques, as will be appreciated by those of ordinary skill in the art. Further, in some aspects, the data structure engine 608 may include more or fewer models than those trained respectively by blocks 604a-604e.

FIG. 6B is an exemplary block flow diagram depicting a computer-implemented method 610 for generating one or more data quality and regulatory knowledge engines using machine learning, according to an aspect. The method 610 may include, at blocks 612a-612e, receiving/retrieving data from a plurality of sources, including structured data, unstructured data, semi-structured data, streaming data and external data. At blocks 614a-e, the data may be analyzed to train a plurality of machine learning models. For example, with reference to FIG. 1, the ML training module 142 may retrieve the data at blocks 612 from the database 126. At block 614a-e, the data may be processed (e.g., by the ML training module 142) to generate one or more trained models.

For example, at block 614a, the ML training module 142 may analyze the data from blocks 612a-612e (or from one or more of the blocks 612) to create a data ingestion process. Specifically, the data in blocks 612 may be historical data relating to past computing environment migration projects that the proprietor of the method 610 has collected over time. The ML model at block 614a may analyze the stored data to predict a data ingestion process based on prior data ingestion processes. At block 614b, the ML training module 142 may analyze the data from blocks 612 to standardize and transform the data. The ML training module 142 may analyze historical data to train a standardization and transformation ML model, by determining from historical data a suitable standardization scheme (e.g., by converting data to a common format, such as JSON). At block 614c, a risk and remediation ML model may be trained by analyzing labeled data from blocks 612.

The labeled data may include a risk score, that is used to train the ML model to predict a risk level of new data (i.e., de novo data) that the model has not seen previously. The ML model may be trained to output an indication of whether data requires remediation. In some aspects, the ML model may perform the remediation, e.g., by masking or withholding data that has a risk level exceeding a risk threshold. At block 641*d*, the ML training module 142 may generate a model that creates a data security process based on data risk. In an aspect, the ML model at block 614*d* may receive output of the model at block 614*c*, e.g., via a data pipeline or as a subsequent layer(s) of an artificial neural network, for example. The data security process may include flagging data, deleting data, quarantining data, alerting a human, and/or other actions. The models trained at blocks 614 may be combined, like the ML models at block 608 of FIG. 6A, to generate a data quality and regulatory engine 616.

In an aspect, the method 610 continuously ingests data from different data sources, varied data types and data formats at block 612. The ML model at block 614*a* may create data ingestion and integration process for different environments on-premise and cloud environments. The ML model at block 614*b* may assess the data, standardize the data, perform de-duplication and do standard data transformations. The ML model at block 614*c* may assess the data and categorize it on a risk score. In an aspect, the risk score is generated based on industry and domain. Then, as a next step the ML model may create processes for management of risks associated with data including related regulations (e.g., BCBS 239, GDPR), risk appetite statement, risk taxonomy, compliance management (3LOD). The ML model at block 614*d* may assess the data and create associated security processes like data encryption based on risk assessment. Risk assessment may be generated based on industry and domain standards in some aspects. The ML model at block 614*d* may also provide clear recommendations regarding the right data storage service (e.g., shared storage vs dedicated storage, etc.) and encryption methods (BYOK etc.) to be used with the short listed cloud providers to protect their sensitive data.

FIG. 6C is an exemplary block flow diagram depicting a computer-implemented method 620 for generating one or more data governance engines using machine learning, according to an aspect. The method 620 may include, at blocks 622*a*-622*e*, receiving/retrieving data from a plurality of sources, including structured data, unstructured data, semi-structured data, streaming data and external data. At blocks 624*a*-*e*, the data may be analyzed to train a plurality of machine learning models. For example, with reference to FIG. 1, the ML training module 142 may retrieve the data at blocks 622 from the database 126. At block 624*a*-*e*, the data may be processed (e.g., by the ML training module 142) to generate one or more trained models.

For example, at block 624*a*, the ML training module 142 may analyze the data from blocks 622*a*-622*e* (or from one or more of the blocks 622) to create a sensitive data sanitization machine learning model. Specifically, the data in blocks 622 may be historical data relating to past computing environment migration projects that the proprietor of the method 620 has collected over time. The ML model at block 624*a* may analyze the stored data to sanitize sensitive data, based on data previously sanitized in prior data sanitization processes. At block 624*b*, the ML training module 142 may analyze the data from blocks 622 to remediate data quality issues. For example, the ML training module 142 may analyze historical data to train a data quality remediation ML model, by determining from historical data the shape of quality data scheme (e.g., comma-separate data wherein each column is properly quoted and escaped). This "correct" data may be used to train the model at block 624*b*. At block 624*c*, a machine learning model may be trained to visualize data profile and data quality. The training data used may be historical data profile and data quality data from past migration processes. Block 624*d* may include training, for example, an unsupervised model identify outliers in the data 622. At block 624*e*, the ML training module 142 may train one or more models to identify data lineage and traceability properties of the data. For example, a ML model may be trained that classifies the data 622 based on its similarity to other known data sets. The trained models at blocks 624 may be combined as discussed herein to form a data governance engine at block 626. As discussed herein, the governance engine and the models at blocks 634 may be serialized and stored (e.g., in an electronic database), and later deserialized and loaded (e.g., using the ML operation module 144).

In some aspects, the method 620 continuously ingests data from different data sources, varied data types and data formats. The ML model at block 624*a* may identify sensitive information in the data and sanitize it. The ML model at block 624*b* may perform a data quality check to ensure data accuracy and find if there are any data quality issues and remediate it. Machine Learning techniques solve different data quality issues, depending on their nature and character. In this example, abnormal behavior may be captured in an unsupervised manner using contextual information. Classification algorithms such as LDA, SVM, Bayes, etc. may be used to identify patterns to predict behavior. To recommend the best value for missing fields, generalized imputation like momenta-imputation, KNN, etc. may be used to identify patterns.

The ML model at block 624*c* may generate visualization of data profiling and data quality. The ML model at block 624*d* may analyze the data and generate an alert if there is any deviation in the data pattern or if there are any issues in the data. In some aspects, the method 620 may will work in conjunction with data pipelines, defined criticality and defined acceptance failure limits. If there is any deviation, the method 620 may alert the user and based on the defined criticality and permissible failure limits, it will process the data pipeline. The ML model at block 624*e* may analyze the data and generate data lineage and traceability for the data. All the trained ML models may be combined as a consolidated data governance engine at block 626, and persistently stored.

Figure 6D:
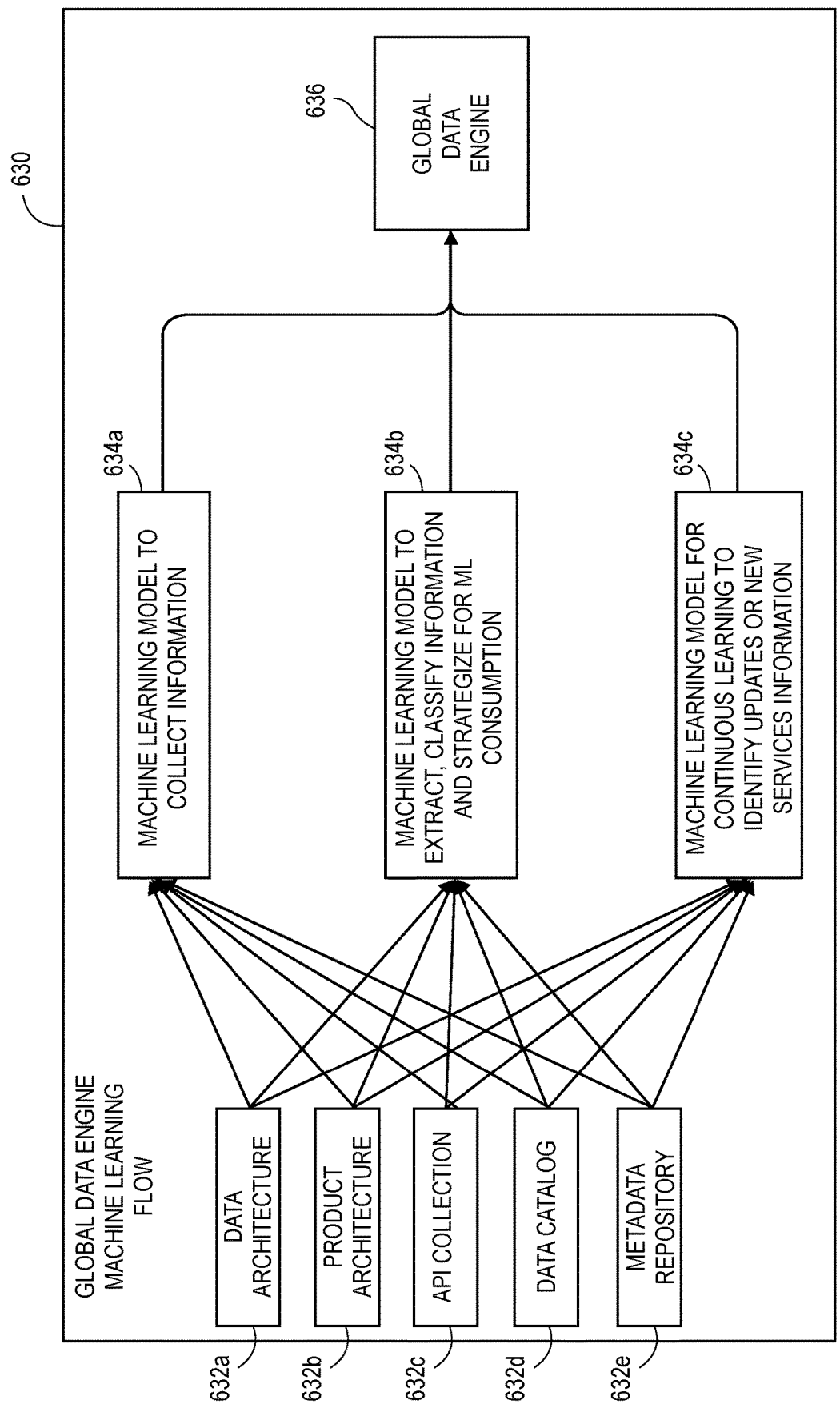
FIG. 6D is an exemplary block flow diagram depicting a computer-implemented method for generating one or more global data engines using machine learning, according to an aspect.

FIG. 6D is an exemplary block flow diagram depicting a computer-implemented method 630 for generating one or more global data engines using machine learning, according to an aspect. The method 630 may include, at blocks 632*a*-632*e*, receiving/retrieving data from a plurality of sources, including data architecture data, product architecture data, API collection data, data catalog data and metadata repository data. At blocks 634*a*-*c*, the data 632 may be analyzed to train a plurality of machine learning models. For example, with reference to FIG. 1, the ML training module 142 may retrieve the data at blocks 632 from the database 126. At block 634*a*-*c*, the data may be processed (e.g., by the ML training module 142) to generate one or more trained models.

For example, at block 634*a*, the ML training module 142 may analyze the data from blocks 632*a*-632*e* (or from one or more of the blocks 632) to generate one or more ML model for collecting information. Specifically, the shape of the data 632 may be analyzed to train a model that can accurately collect information having a similar shape/data format. At block 634*b*, the ML training module 142 may train a ML model to extract, classify and strategize for ML consumption of data. For example, the ML model may optimize speed of data collection and processing by, for example, ingesting smaller packets of data. In some aspects, other data collection strategies may be more efficient, and thus, chosen by the ML optimization. At block 634c, the method 630 may train one or more ML models for continuous learning to identify updates to existing services affecting the future computing environment 108 of FIG. 1, or new services. Continuous learning is discussed further below. The models at blocks 634 may be combined into a global data engine 634, as discussed.

Figure 6E:
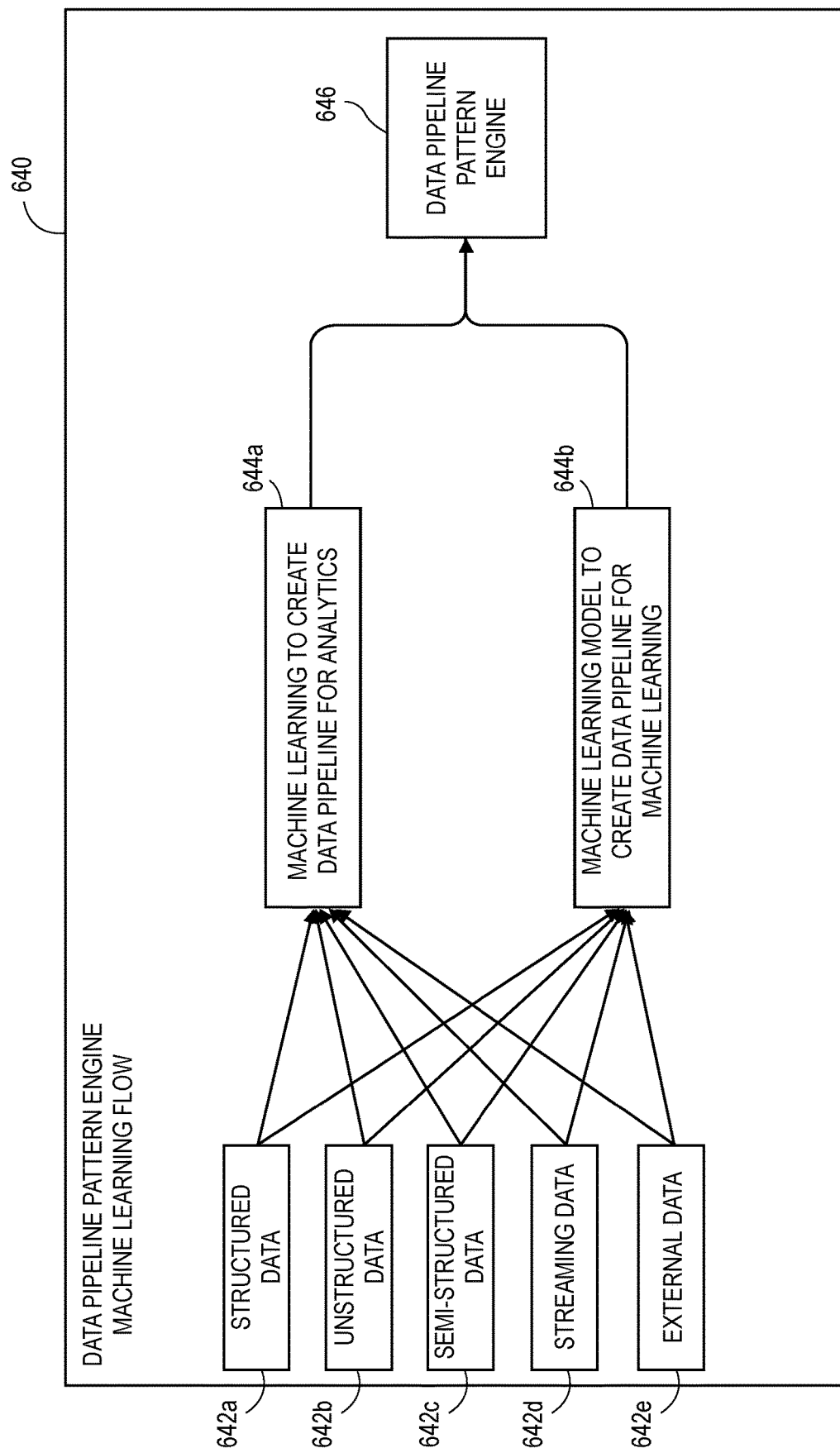
FIG. 6E is an exemplary block flow diagram depicting a computer-implemented method for generating one or more data pipeline pattern engines using machine learning, according to an aspect.

FIG. 6E is an exemplary block flow diagram depicting a computer-implemented method 640 for generating one or more data pipeline pattern engines using machine learning, according to an aspect. The method 640 may include, at blocks 642a-642e, receiving/retrieving data from a plurality of sources, including structured data, unstructured data, semi-structured data, streaming data and external data. At blocks 644a-b, the data may be analyzed to train a ML model data pipeline for analytics, and an ML model to create a data pipeline for machine learning. Specifically, at block 644a, a machine learning model is trained to create a data pipeline for analytics. Specifically, historical data pipelines may be fed into the ML model, as training examples.

The ML model may learn to organize data 642 into a data pipeline resembling the training examples. Block 644b is an examples of meta-machine learning, wherein machine learning techniques are used to build other machine learning models. Such bootstrapping, in the present techniques, includes using machine learning pipelines previously used to train one or more machine learning models to train a machine learning model at block 644b to generate data pipelines, based on the data 642, that may be used to train additional machine learning models. The models trained at blocks 644 may be combined into a data pipeline pattern engine at block 646.

In an aspect, the method 640 continuously ingests data from different data sources, varied data types and data formats 642. The ML model trained at block 644a may create a data pipeline for analytics. The ML model trained at block 644b may create data pipeline for machine learning. Both ML models at blocks 644 may perform continuous improvement. The continuous learning innovation element will also check if there are any technical debt or if there are any lack of efficiencies and will propose better solutions. Data pipelines for analytics and machine learning may be refactored based on the better solutions output by the ML models.

Figure 6F:
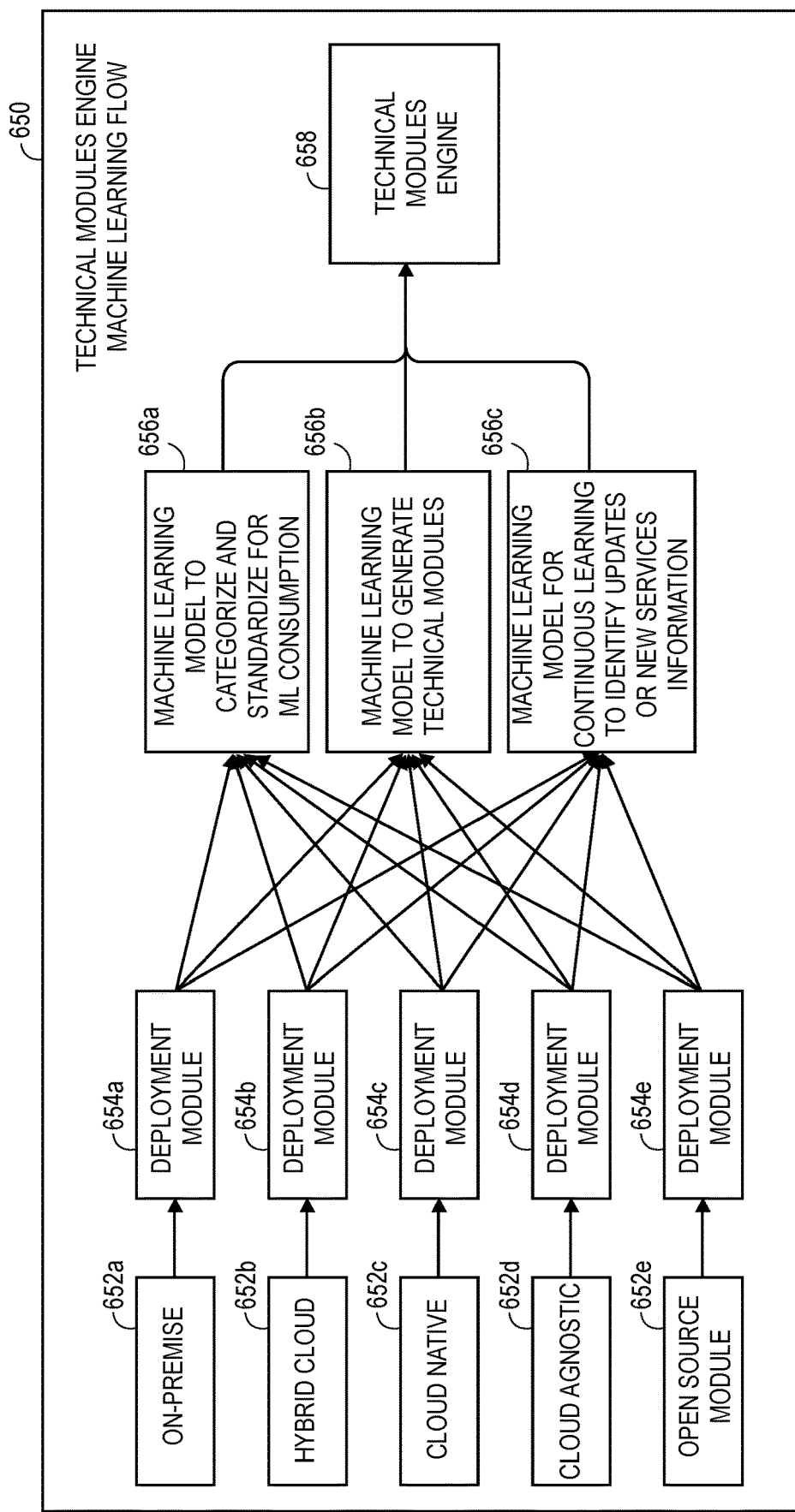
FIG. 6F is an exemplary block flow diagram depicting a computer-implemented method for generating one or more technical module engines using machine learning, according to an aspect.

FIG. 6F is an exemplary block flow diagram depicting a computer-implemented method 650 for generating one or more technical module engines using machine learning, according to an aspect. The method 650 may include, at blocks 652a-652e, receiving/retrieving deployment data from a plurality of current sources, including an on-premise deployment source, an hybrid cloud deployment source, a cloud native deployment source, a cloud agnostic deployment source, and an open source deployment source. At blocks 654a-654e, a respective deployment module receives respective deployment data from the plurality of current sources.

At blocks 656a-656c, models are trained using the current deployment data. At block 656a, the method 650 trains an ML model to categorize and standardize the deployment data for ML consumption. The training may include harmonizing deployment data constructs. For example, each of the blocks 652 may include the concept of an SQL database, going by different names. The training at block 656a may include training the ML model to encode all database information using similar conventions. Blocks 656b and 656c may, respectively, analyze the current deployment data to train respective ML models to generate technical modules and to perform continuous learning and identify updates/new services, as discussed herein. The models trained at blocks 656 may be combined to form a technical modules engine at block 658.

In some aspects, the method 650 may be used for periodic review of the health of the cloud technology solutions and for performing systematic upgrades. The technical module engine 658 may be powered by blocks 652, that may comprise an on-premise module, a hybrid cloud module that is a combination of multiple cloud and on-premise services, a cloud native service that is exploring all updates or new cloud native services feed, a cloud agnostic service that which explores all updates or new cloud agnostic services feed as well as an open source service that is fed from all new or updates in the open source frameworks. The blocks 652 may generate detailed respective deployment modules 654 that are then fed into three ML models at blocks 656. The first ML model, at block 656a, may use the deployment module 654 to categorize and standardize the data from ML consumption, the second ML model at block 656b may generate the technical modules 658, while the third ML model 656c is continuously learning to identify updates or new service information that are together fed into the technical modules engine 658.

Figure 6G:
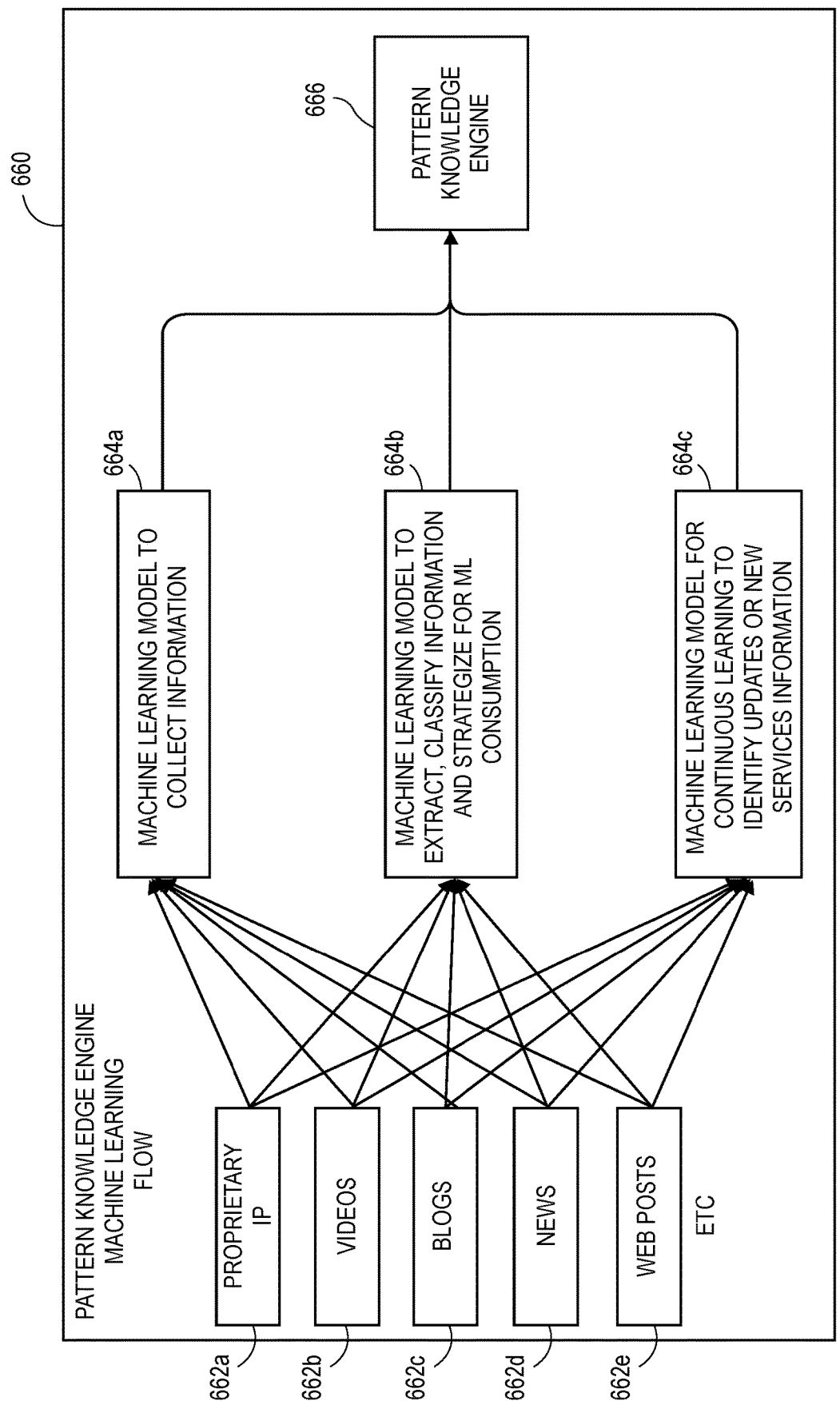
FIG. 6G is an exemplary block flow diagram depicting a computer-implemented method for generating one or more pattern knowledge engines using machine learning, according to an aspect.

FIG. 6G is an exemplary block flow diagram depicting a computer-implemented method 660 for generating one or more pattern knowledge engines using machine learning, according to an aspect. The method 660 may include receiving data from a plurality of sources 662a-662e, including proprietary intellectual property, video data, blog data, news data, web post data, and in some aspects, other data (e.g., social media data). It should be appreciated that the data sources in FIGS. 6A-6H may vary, and more or fewer may be used, depending on the particular aspect.

The data received at blocks 662 may be processed by blocks 664a-664c. Specifically, at block 664a, the method 660 may train a machine learning model to collect information. For example, existing stored information may be provided to the ML model, so that the ML model is able to store de novo data from the data 662 without the need to specify explicit storage formatting. The method 660 may include training an ML model to extract, classify and strategize, as at block 634b of FIG. 6D. At block 664c, an ML model may be trained (e.g., using historical press releases or product announcement literature) to identify new/updated services, as discussed herein. The models trained at blocks 664 may be combined, at block 666, into a pattern knowledge engine.

As noted above, the ML models in FIGS. 6A-6H are self-learning and keep current with the rapidly evolving public and private cloud technology environments. For example, the method 660 may continuously ingest data from various internal and external data sources at blocks 662, as well as other potential sources (not depicted) such as an asset management repository, and a cloud consumption and billing data repository. This data may be fed into various ML models at blocks 664 to generate deployment modules in a pattern knowledge engine 666 that may be used to directly deploy the future state on-premise or in any public cloud environment. In some embodiments, the blocks 662 include enterprise intellectual property data that codifies enterprise domain expertise into a future architecture. For example, the ML model at block 664a may collect all information from these various data sources. The ML model at block 664b may extract and classify the information and strategize it for ML consumption. The ML model at block 664c may continuously learn based on updates or new services information being made available from various data sources, output lack of efficiencies and propose better solutions.

Figure 6H:
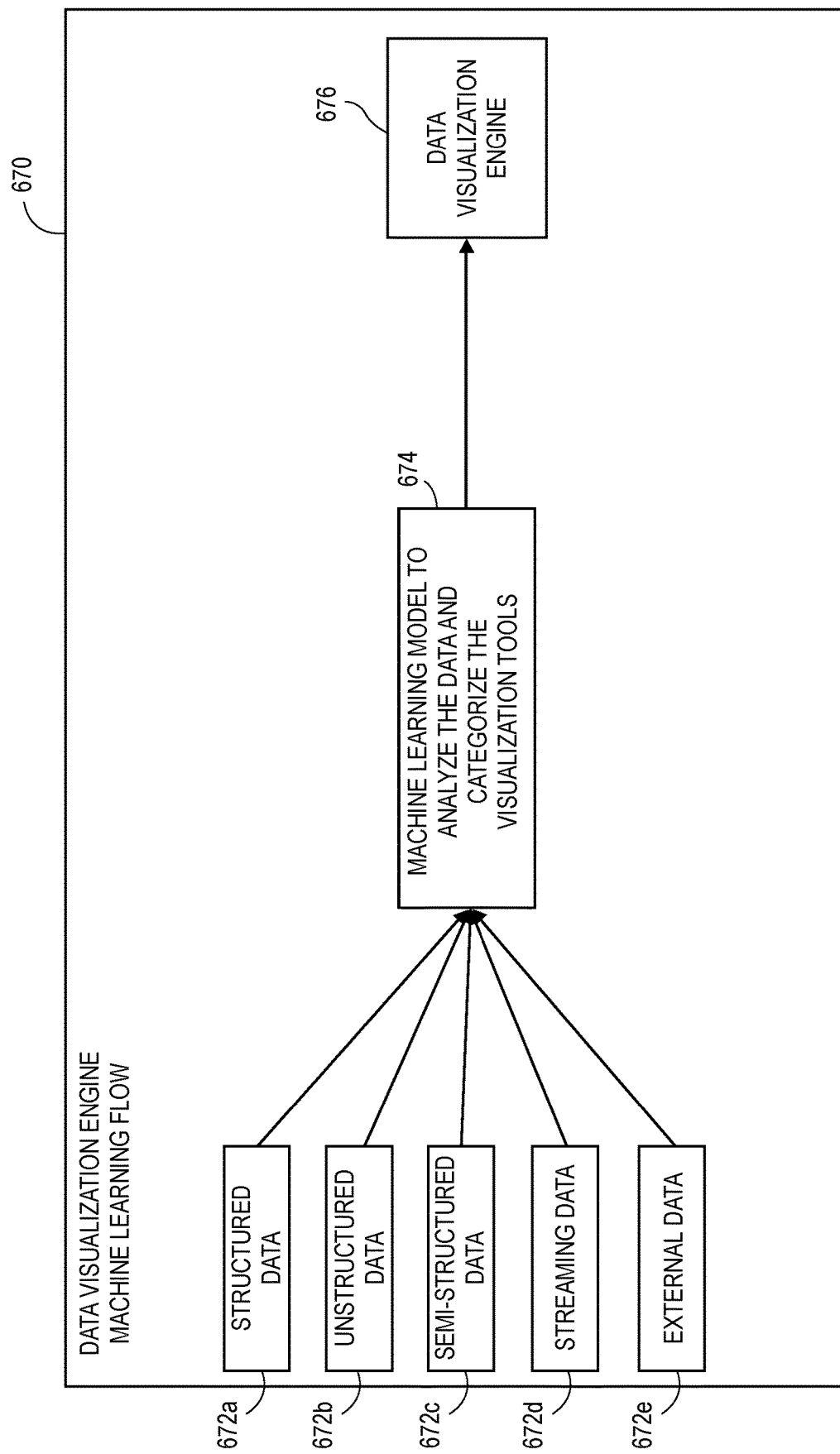
FIG. 6H is an exemplary block flow diagram depicting a computer-implemented method for generating one or more data visualization engines using machine learning, according to an aspect.

FIG. 6H is an exemplary block flow diagram depicting a computer-implemented method 670 for generating one or more data visualization engines. The method 670 may include, at blocks 672a-672e, receiving/retrieving data from a plurality of sources, including structured data, unstructured data, semi-structured data, streaming data and external data. At block 674a, the data 672 may be analyzed to train a ML model data to analyze the data 674 and categorize visualization tools. For example, the ML model at block 674 may be provided with example visualizations, such as column charts, line graphs, bar graphs, stacked bar graphs, dual-axis charts, pie charts, bubble charts, scatter plots, etc. The model may thus be trained to classify de novo data according to the type of visualization represented by the data.

In some aspects, a model may be trained to predict one or more suitable visualization tools for a data set, based on suitability. For example, the ML model may encode information such as the fact that percentages may be more suitably depicted using a pie chart than a bar chart. The model trained at block 674 may be encoded as a data visualization engine at block 676. Once trained, trained weights of any of the models depicted in FIGS. 6A-6H may be stored, for example in an electronic database, allowing the models to be instantly parameterized and used (including by being trained further or used in transfer learning) without retraining.

The method 670 may enable users (e.g., customers, administrators, programmers, etc.) to create low code/no code visualizations to visualize, discover, and generate insights with or without coding skills. For example, in some aspects, the method 670 may include what you see is what you get (WYSIWYG) visualization tools for generating visualizations. In some aspects, the method 670 may include instructions that enable the ML model at block 674 to generate visualizations using more complex tools (e.g., visualization libraries such as Matplotlib, D3, etc.).

In some aspects, the method 670 may continuously ingest data from different data sources, varied data types and data formats at blocks 672. The ML model at block 674 may analyze the data and categorize it for different cloud based and vendor based visualization tools. It will be appreciated by those of ordinary skill in the art that visualization output at block 676 may varies by persona, use case and/or platform.

It will be appreciated by those of ordinary skill in the art that the knowledge engines (e.g., the data quality and regulatory engine 616 of FIG. 2B), once trained and combined, may be used in conjunction with the present techniques, and/or used for other purposes (e.g., in an unrelated banking application). It is envisioned that the knowledge engines generated by the present techniques may be made available as services to a third party via the servers 104 of FIG. 1, for example using a pay-per-query model. Further, the engines may include wrapper code that enables them to be parameterized and easily accessed using a user-friendly API, such as a Representational State Transfer (REST) API.

Still further, it will be appreciated by those or ordinary skill in the art that the ML training and/or operation steps of the methods of FIGS. 6A-6H may be performed in serial/sequential order and/or in parallel, in some aspects. For example, at blocks 604a-e, the data may be analyzed to train a plurality of machine learning models wherein each model is trained independently using the data received at blocks 602. In other aspects, block 604a may first train an ML model to categorize data types/ formats as discussed above, and then train another ML model at the block 604b. In some embodiments, the output of the trained ML model at block 604a may be passed to the block 604b as input to the ML model trained at block 604b. In some embodiments, an ML model at one or more of blocks 604 may be used in an inference mode, wherein the output of the blocks 604 is passed to another ML model to generate additional inferences. For example, output of the ML model at block 624a may output sanitized sensitive data, and the block 624b may accept the sanitized sensitive data as one or both of training input and inference input.

Exemplary Automated Cloud Data and Technology Solution Delivery Using Machine Learning and Artificial Intelligence With reference to FIG. 2, the output of knowledge engines at block 210 (e.g., the knowledge engine 220) may be consumed by one or more trained ML/AI models 230, to create output with recommendations and implementation that follow the options selected by the customer (e.g., step-by-step or one-click deployment). The ML/AI models 230 advantageously translate complex work conventionally done manually (e.g., in house) into ML data enabling training of models to make recommendations based on input from clients and their objectives/needs. Further improvements of the present techniques over conventional techniques are seen in the fact that the ML/AI models 230 may be used not only for an initial migration, but also for upkeep—advantageously, the present techniques include ML models, scanners, and rules that help customers to upgrade/upkeep their computing environments, predictively rather than proactively. The present techniques represent an advantage over conventional techniques, because humans cannot keep up with the pace of change in multiple clouds, cloud agnostic environments, open source environments, etc. to capture new features as well as changes to existing cloud features (e.g., when AWS adds new features).

The present techniques are faster than human-based techniques, given that the present techniques are available 24 hours per day. Still further advantages of the present techniques include the elimination of unconscious bias toward certain technologies and/or technology providers/stacks. For example, a programmer familiar with a particular language or framework (e.g., Java) may allow subjectivity into the decision-making process. A manager or engineer who prefers Amazon/Azure or certain software providers, or data tool providers, will sometimes recommend their products without regard to whether the product is the best for the customer. Similarly, the proprietor of the present techniques may have large quantities of institutional knowledge (e.g., knowledge, documents, insight, data, etc.). Knowledge management architects may be biased by what they have always done, whereas the ML/AI model at block 230 may reach a different outcome. People may be biased toward what they know and are comfortable/familiar with. Even if a customer does not know what they want, they still benefit from bias elimination.

In some aspects, the present techniques utilize a champion-challenger algorithm to test different competing solutions, while the solution is running. Challenging patterns and knowledge of system continuously improves innovation and quality of system—the more knowledge/challenge, the better the system becomes. For example, pricing of various cloud platform providers may change frequently. The champion challenger algorithm may include instructions for continuously evaluating the cost of cloud providers, and for updating the future computing environment 108 of the customer dynamically in response to more favorable pricing.

This capability is enabled by translating knowledge of artifacts into codified data that is consumable by the knowledge engines and ML models of the present techniques, as discussed herein.

Exemplary Machine Learning Models

Figure 7:
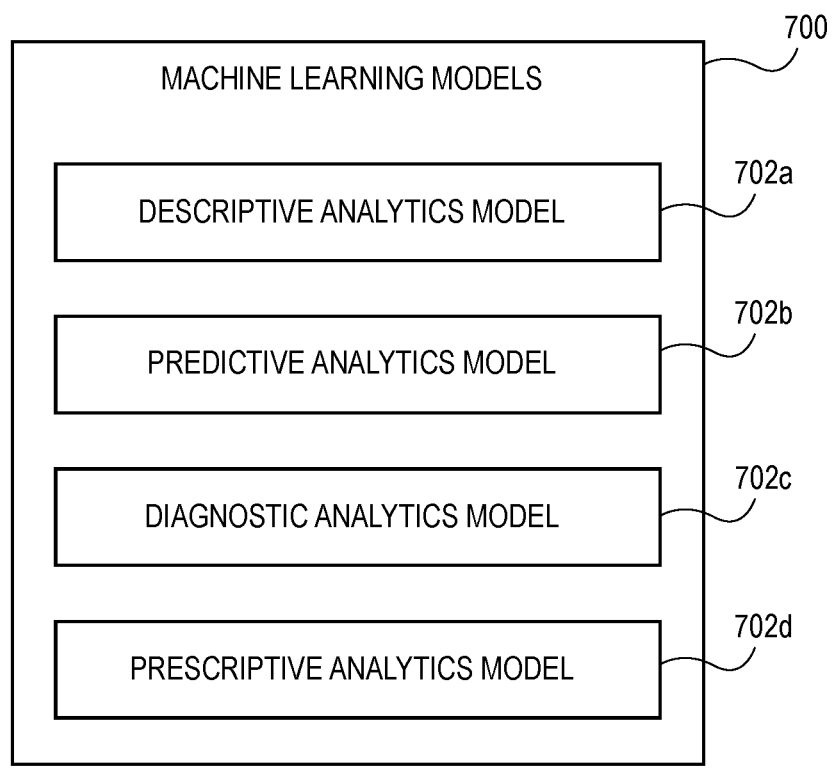
FIG. 7 is an exemplary block diagram depicting exemplary machine learning and artificial intelligence models, according to an aspect.

FIG. 7 is an exemplary block diagram depicting exemplary ML/AI models, according to an aspect. At block 700, several individual trained ML/AI models 702 are depicted. The block 700 may correspond to the block 230 of FIG. 2, in some aspects. Block 702a includes a descriptive analytics model. Block 702b includes a predictive analytics model. Block 702c includes a diagnostic analytics model. Block 702d includes a prescriptive analytics model. In some aspects, more or fewer models 702 may be included. The models 702 may be trained as discussed herein (e.g., by the ML training module 142 of FIG. 1) and operated as discussed herein (e.g., by the ML operation module 144). The models 702 may be trained by executing the one or more knowledge engines 210, in some aspects. The training and operation of the models 702 is discussed in detail, below.

Exemplary Computer-Implemented ML Model Training and/or Operation

Figure 8A:
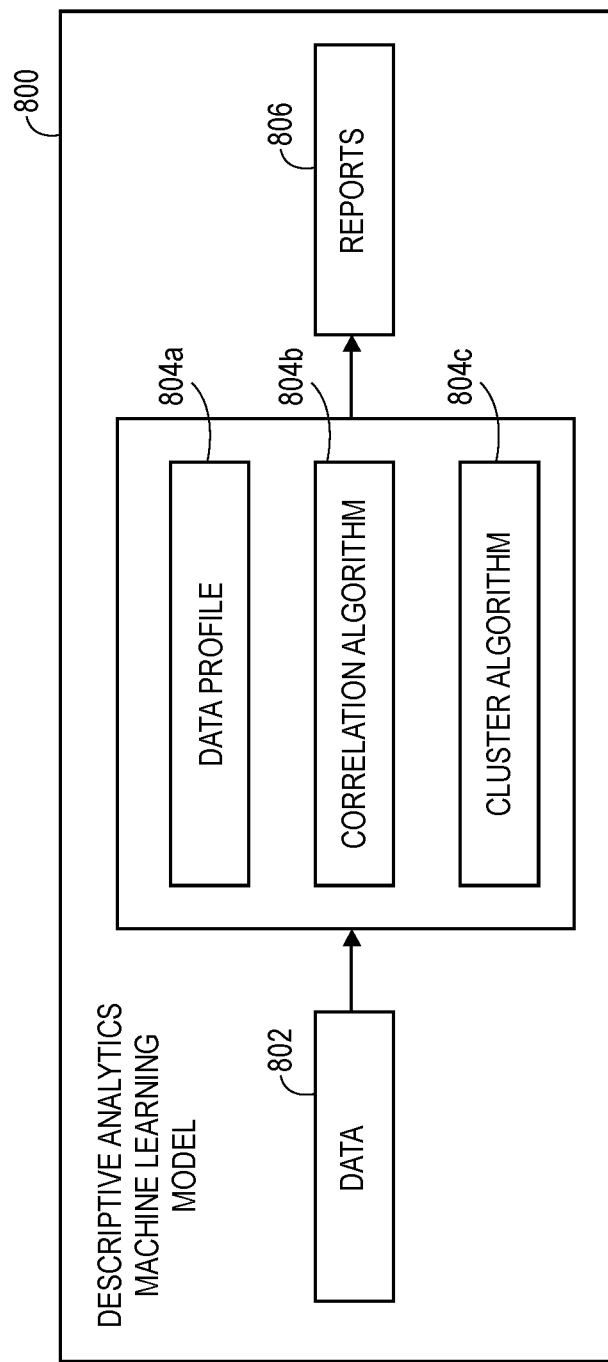
FIG. 8A is an exemplary block flow diagram depicting a computer-implemented method for training and/or operating a descriptive analytics machine learning model, according to one aspect.

FIG. 8A is an exemplary block flow diagram depicting a computer-implemented method 800 for training and/or operating a descriptive analytics machine learning model (e.g., the descriptive analytics model of block 702a), according to one aspect. The method 800 includes receiving/retrieving data at block 802. The data may correspond to the data generated by the knowledge engines at block 210 of FIG. 2. The method 800 includes analyzing the data at blocks 804a-804c. At block 804a, the method 800 may compute descriptive statistics such as maximums, minimums, counts and sums. At block 804b, the method 800 may analyze data (e.g., historical data) to identify correlations between the data and outcomes. At block 804c, the method may analyze data (e.g., historical data) to identify, using unsupervised ML, one or more clusters in data. The method 800 may include generating one or more reports at block 806. The reports may include information identified at the blocks 804, in some aspects. For example, the method 800 may be used to identify slow code paths in the customer's current/legacy environment 106, or to identify efficient service groupings/clusters.

In some aspects, the method 800 is a building block of the ML and AI models that comprise block 230 of FIG. 2. Data from various sources may be analyzed in method 800 to understand what has occurred in a running system via profiling, identifying patterns and analyzing correlations between profiling data and outcomes, and by clustering the data in groups based on different features.

Figure 8B:
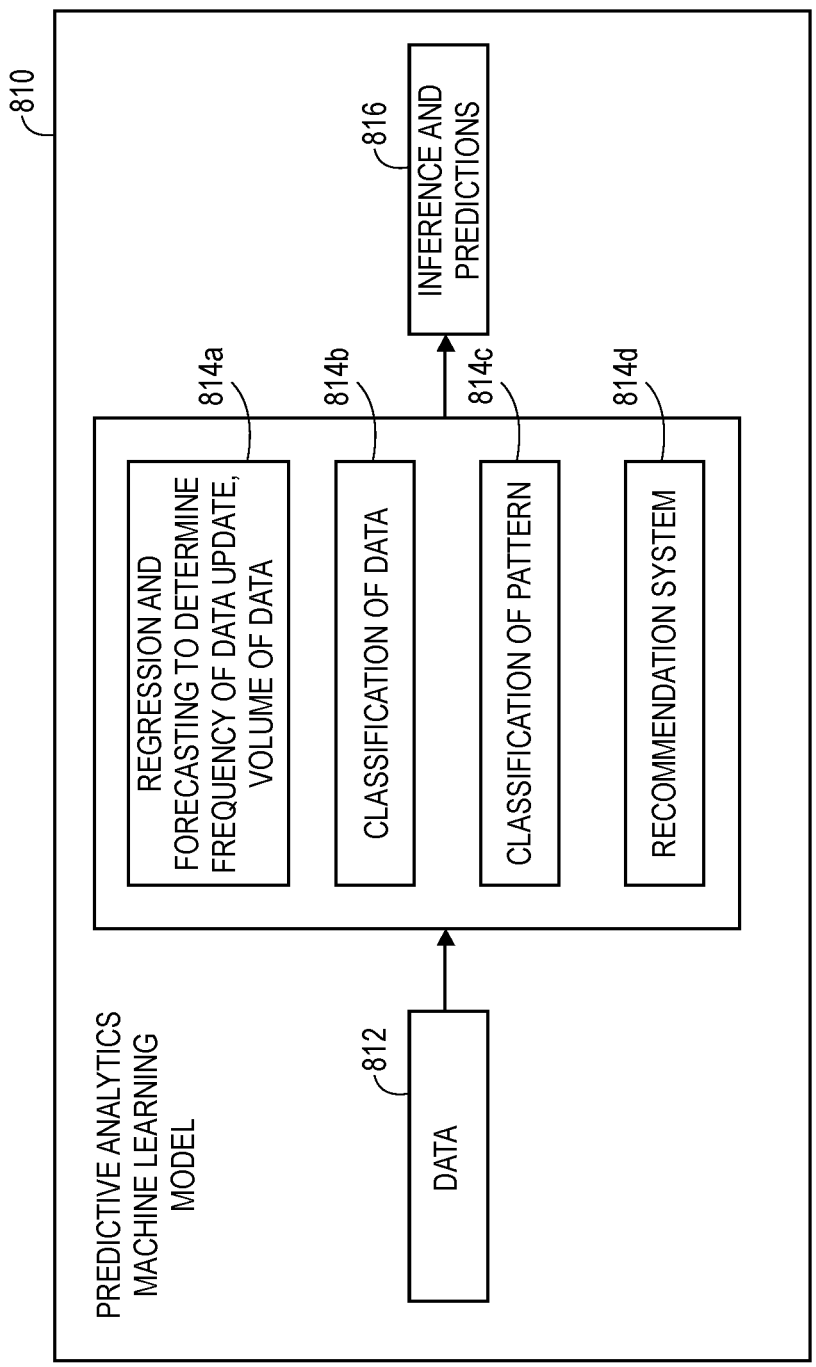
FIG. 8B is an exemplary block flow diagram depicting a computer-implemented method for training and/or operating a predictive analytics machine learning model, according to one aspect.

FIG. 8B is an exemplary block flow diagram depicting a computer-implemented method 810 for training and/or operating a predictive analytics machine learning model (e.g., the predictive analytics model of block 702b), according to one aspect. The method 810 may include receiving/retrieving code at block 812, corresponding to block 802 of FIG. 8A, in some aspects. The method 810 may include analyzing the data from block 812 using one or more blocks 814a-814d. For example, at block 814a, the method 810 may include performing a regression and/or forecasting analysis to determine a frequency of a data update and/or a volume of data. At block 814b, the method 810 may include classifying data into one or more categories (e.g., as a binary classification, a multi-class classification, etc.). In some aspects, the method 810 may include performing classification of patterns in the data at block 814c, such as behavioral patterns, structural patterns, design patterns, architectural patterns, etc. In some aspects, the method 810 may include a recommendation system at block 814d. The method 810 may include generating one or more inferences and/or predictions at the block 816.

In some aspects, the predictive analytics blocks 814 of the method 810 predict future outcomes based on the existing data at block 812. In operation, the method 810 may be used to predict and forecast frequency of data update and volume of data at. One or more ML models trained at blocks 814 may be used to classify data from block 812 and to classify different patterns. This method 810 may also be used, in some aspects, to provide recommendations for data solutions.

Figure 8C:
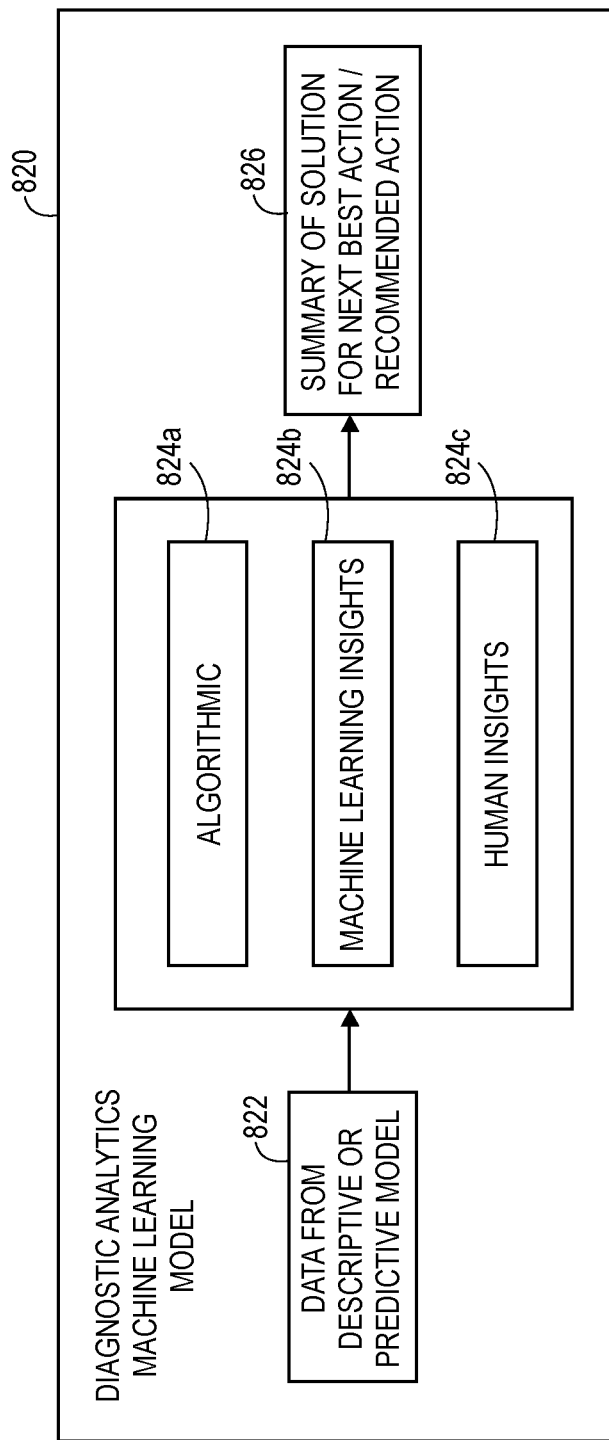
FIG. 8C is an exemplary block flow diagram depicting a computer-implemented method for training and/or operating a diagnostic analytics machine learning model, according to one aspect.

FIG. 8C is an exemplary block flow diagram depicting a computer-implemented method 820 for training and/or operating a diagnostic analytics machine learning model (e.g., the diagnostic analytics model of block 702c), according to one aspect. The method 820 may include, at block 822, receiving/retrieving data from one or more descriptive ML model (e.g., the one or more ML model trained by the method 800) and/or one or more predictive ML model (e.g., the one or more ML model trained by the method 810). The data at block 822 may include descriptive and/or prescriptive inferences, that may be processed at blocks 824a-824c using various approaches. For example, the inferences may be analyzed using an algorithmic approach at block 824a, using ML insights at block 824b and/or using human insight at block 824c. The blocks 824 may generate respective summaries of solutions for next best actions (i.e., one or more recommended actions) at block 826.

Figure 8D:
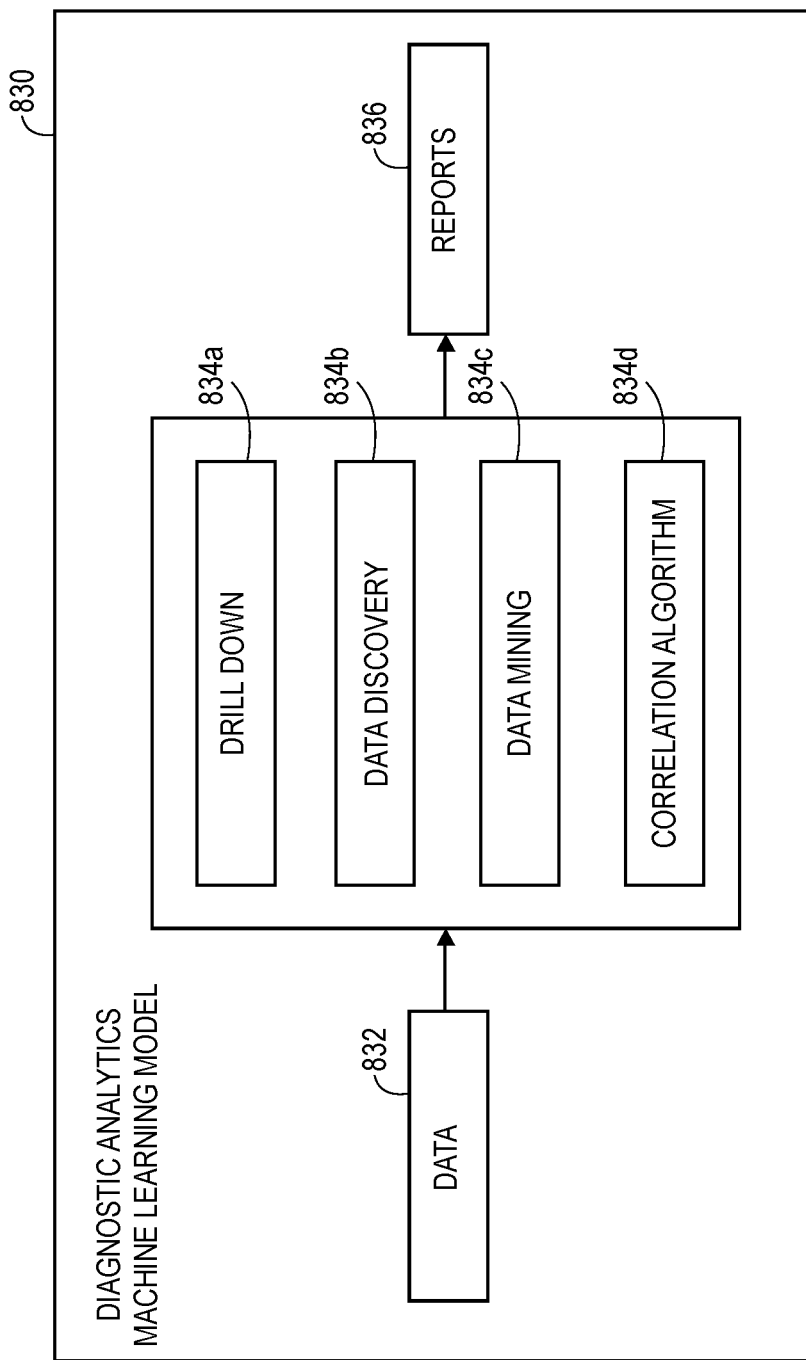
FIG. 8D is an exemplary block flow diagram depicting a computer-implemented method for training and/or operating another diagnostic analytics machine learning model, according to one aspect.

FIG. 8D is an exemplary block flow diagram depicting a computer-implemented method 830 for training and/or operating a diagnostic analytics machine learning model (e.g., the diagnostic analytics model of block 702c), according to one aspect. The method 830 may correspond to the method 820, in some aspects. The method 830 may receive/retrieve data at block 832 corresponding to the data received at block 822. At block 834a-834d, the method 830 may include sets of computer-executable instructions for training and/or operating additional and/or alternative diagnostic ML models to generate one or more reports at block 836.

In operation, the methods 820 and 830 may be building blocks of the ML and AI models that comprise block 230 of FIG. 2. Data from various sources may be analyzed in method 800 to understand what has occurred in a running system by drilling down the data, performing data discovery and correlation of data.

Figure 8E:
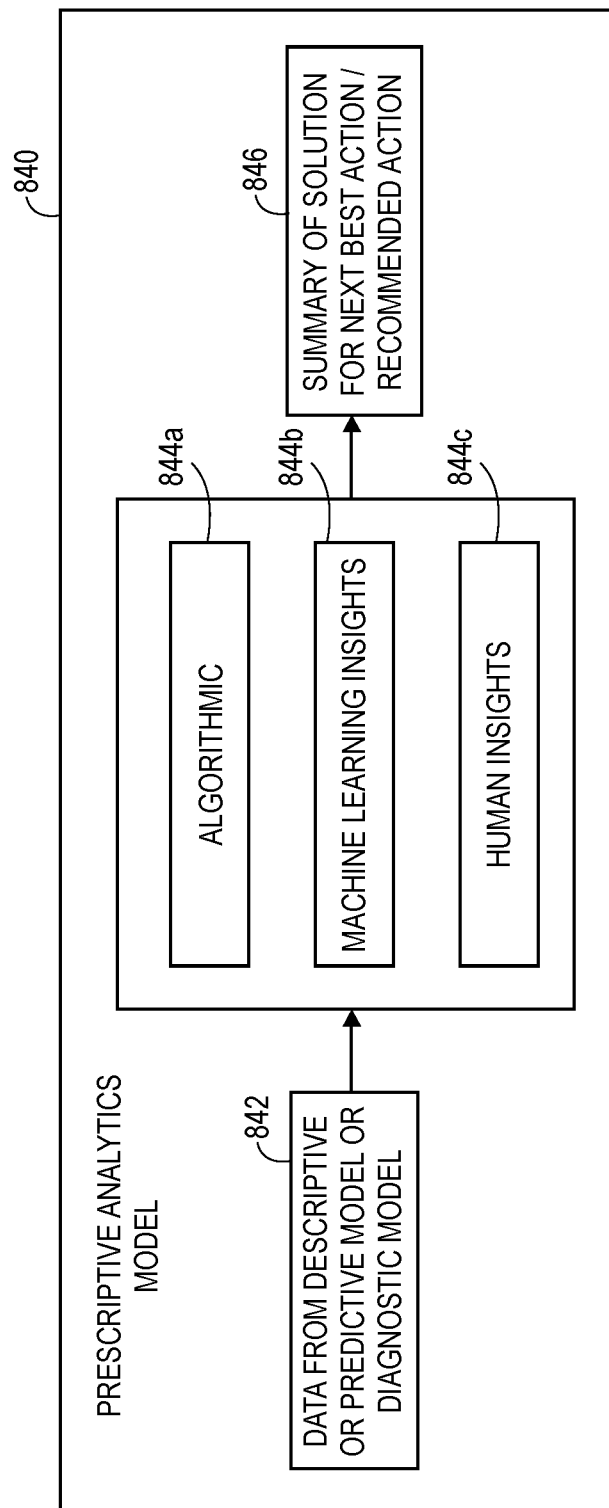
FIG. 8E is an exemplary block flow diagram depicting a computer-implemented method for training and/or operating a prescriptive analytics machine learning model, according to one aspect.

FIG. 8E is an exemplary block flow diagram depicting a computer-implemented method 840 for training and/or operating a prescriptive analytics machine learning model (e.g., the prescriptive analytics model of block 702d), according to one aspect. The method 840 may include, at block 842, receiving/retrieving data from one or more descriptive ML model (e.g., the one or more ML model trained by the method 800) and/or one or more predictive ML model (e.g., the one or more ML model trained by the method 810). The data at block 842 may include descriptive and/or prescriptive inferences, or a diagnostic ML model (e.g., the ML model of method 830), that may be processed at blocks 844a-844c using various approaches. The blocks 844 may determine one or more summaries of a solution for next/best action or recommended action. Generally, the prescriptive analytics ML model enables the customer and the proprietor of the current techniques to reflect on all building blocks comprising the future computing environment 108, by analyzing, for example, options from reinforcement learning, classification, and time to market/cost/frequency models.

In operation, one or more prescriptive analytics machine learning models in method 840 may generate one or more prescription to showcase the next best action or recommended action based on the data from descriptive, diagnostic and predictive model. The method 840 may use a blend of algorithmic knowledge, insights generated from machine learning models and human insights, in some aspects.

Exemplary Output Engine Computer-Implemented Methods

Figure 9:
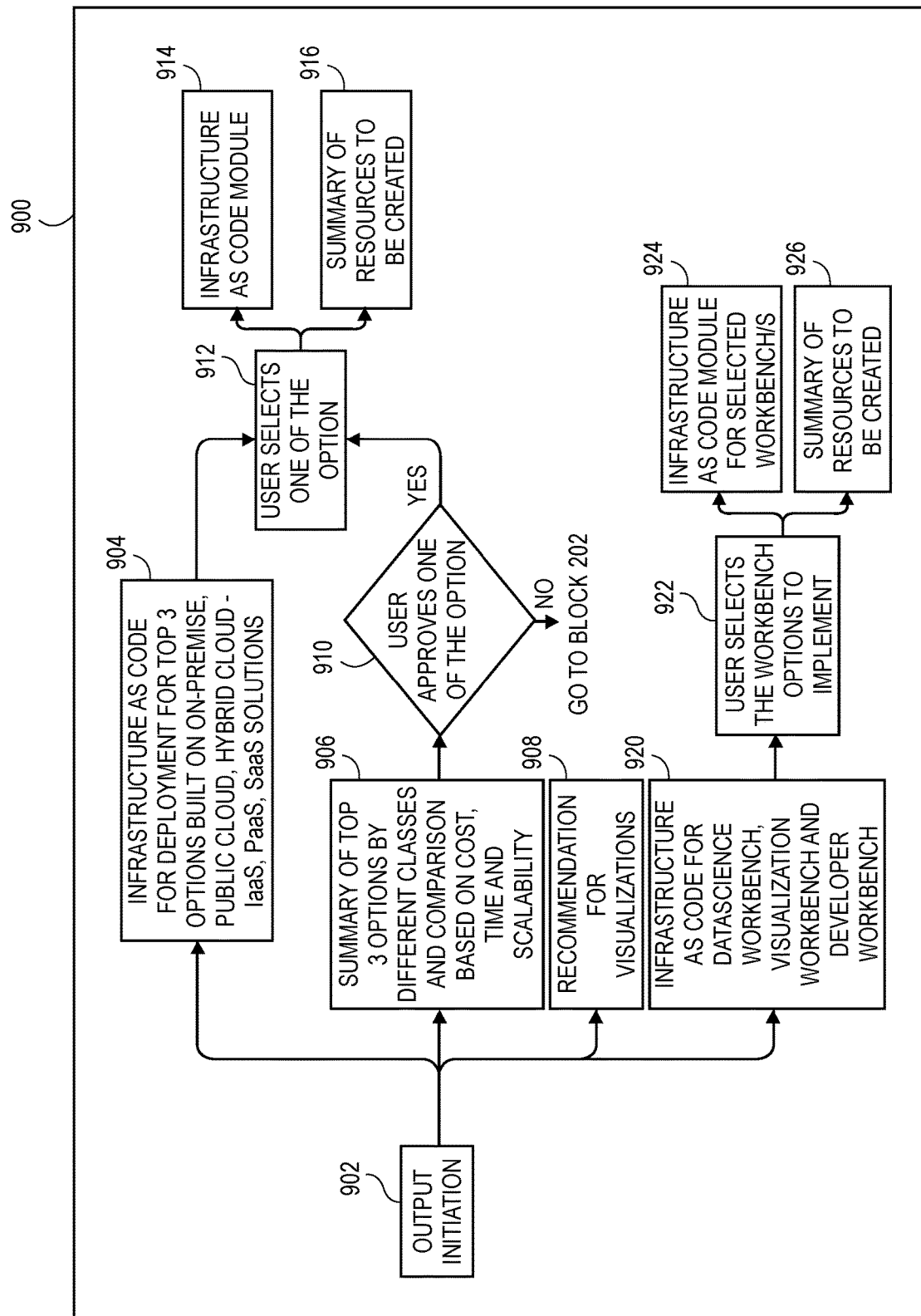
FIG. 9 is an exemplary block flow diagram depicting a computer-implemented output engine method, according to an aspect.

FIG. 9 is an exemplary block flow diagram depicting a computer-implemented output engine method 900, according to an aspect. For example, the output engine method 950 may correspond to block 240 of FIG. 2. At block 902, an output initiation procedure may process output of one or more of the methods of FIGS. 8A-8E. At block 902, the method 900 initiates an output operation. At block 904, the method 900 generates infrastructure-as-code for deployment across one or more (e.g., three) service type and computing target options, such as on-premise, public cloud, hybrid cloud; Iaas, PaaS and SaaS. The generation of options in the method 900 may be based on, or include, execution of one or more of the methods discussed above, including the method 200, the method 300, the method 400, the method 500, the method 550, the method 550, the method 600, the method 610, the method 620, the method 630, the method 640, the method 650, the method 660, the method 670, the method 800, the method 810, the method 820, the method 830, and/or the method 840

At block 906, the method 900 may generate a summary of the one or more options arranged by different factors, such as cost, time and/or scalability of the respective options. The method 900 may generate recommendations for visualizations of the options at block 908. The method 900 may collect a user approval of one of the options at block 910, and then a user selection of one of the options (e.g., via the I/O module 146 of FIG. 1).

Next, the method 900 may generate an infrastructure-as-code module at block 914, and/or a summary of resources to be created at block 916. In aspects where the user desires a turnkey implementation, the infrastructure-as-code module may be immediately deployed (e.g., as a cloud-based deployment image). For example, the infrastructure-as-code module may include one or more machine image (e.g., an Amazon Machine Image (AMI)). The infrastructure-as-code module may include one or more script(s) for installing, initializing and configuring the one or more machine image(s), and for loading software services, code and data into the machine images, and for connecting the machine images together (e.g., via a Virtual Private Network (VPN) or other networking scheme). If the user does not approve of one of the options at block 910, the method may revert to an earlier method, such as the acceleration and readiness system 202 of FIG. 2, to collect additional information from the user and the user's current computing environment, as at block 918.

At block 920, the method 900 may further include generation of infrastructure-as-code for a data science workbench, a visualization workbench and/or a developer workbench. The user may select one or more of the workbenches and workbench options for implementation at block 922, in response to the generation at block 920. The method 900 may include generating infrastructure-as-code for one or more of the selected workbenches at block 924, and/or a summary of computing resources (e.g., a list of cloud computing instances) to be created in carrying out the infrastructure-as-code at block 926.

In operation, the output engine 900 generates the detailed deployment plan for the top N (e.g., 3 or fewer) future state options built on on-premise, public cloud, hybrid cloud IaaS, PaaS, SaaS solutions, while also presenting a detailed summary of top N recommended options based on benchmarking index and by different classes and comparisons based on cost, time and scalability . The user may select from the options and then based on the selection, the method 900 may generate detailed infrastructure as code deployment modules to migrate the current computing environment to the future computing environment as well as a summary of the resources to be created manually by the user, if they prefer. The method 900 may also generate a documentation with details of recommendations for visualizations that can be created. The ML models of method 900 may output the maturity index benchmark allowing the enterprise to monitor the transformation program progress at all times (i.e., a "FICO score for cloud and data delivery"). The method 900 may present deployment options (lift and shift, shift and lift, etc.) along with rough time and cost estimates related to various deployment options along with a clear recommendation allowing the users to make the final choice for the right deployment model for an enterprise. The method 900 may also generate infrastructure as code for data science workbench, visualization workbench and developer workbench. Data science workbench may provide users a platform to get started with a ML model in a very short span of time. Visualization workbench will help to create visualizations for storytelling, and will also process data efficiently automating standardized data preparation and transformation. Visualization workbench will enable sharing of dynamic visualization in the organization, solving inefficiencies in conventional technologies. Developer workbench will provide users a platform to start with the development work and be more efficient and productive. The method 900 may provide the customer with options for selecting one or more workbenches, and based on the user selection, infrastructure as code for selected workbenches and summary of resources to be created for workbenches are generated for user review.

Figure 10:
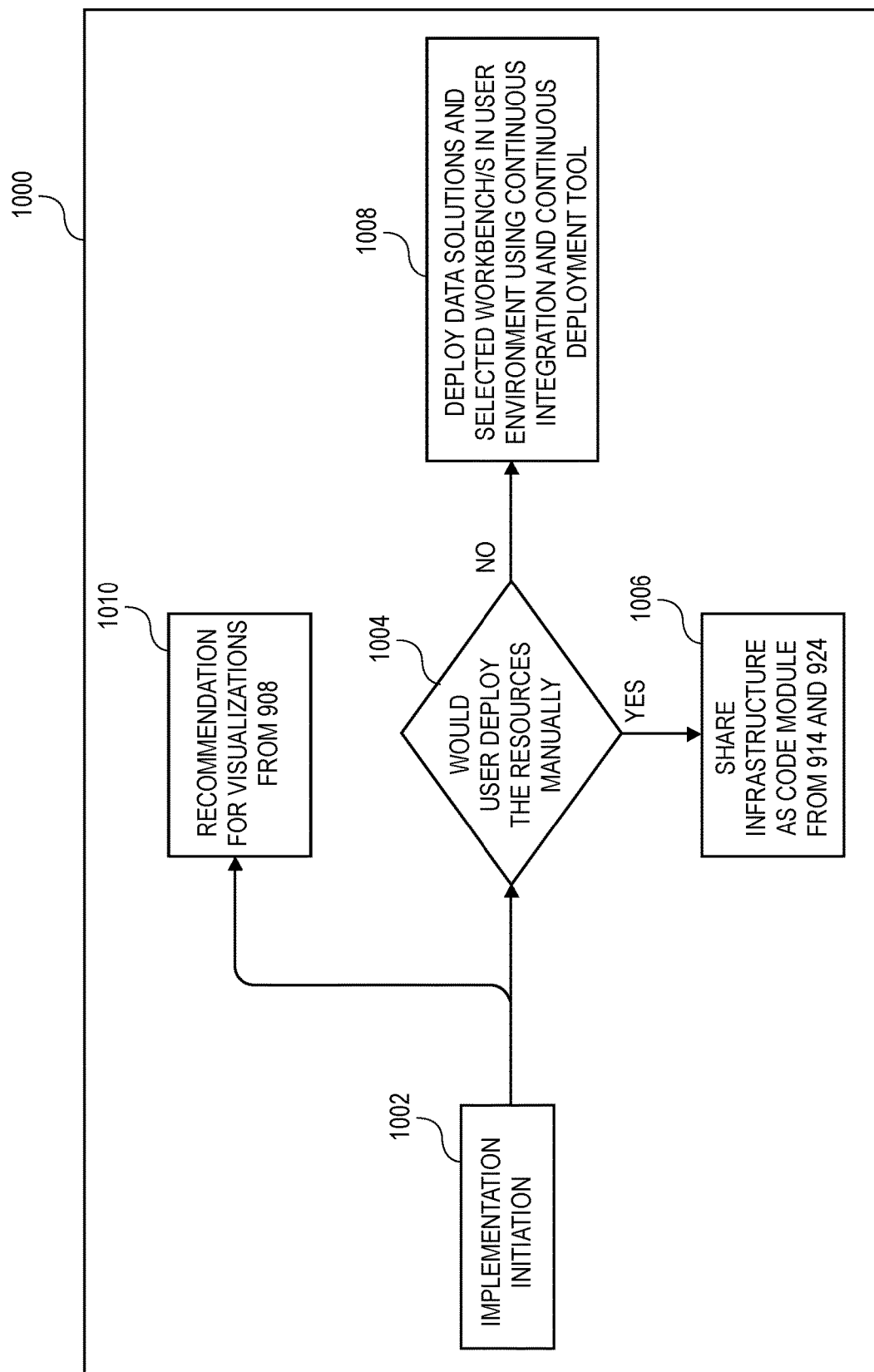
FIG. 10 is an exemplary block flow diagram depicting a computer-implemented implementation engine method, according to an aspect.

Exemplary Computer-Implemented Infrastructure-as-Code Implementation Initiation Method FIG. 10 is an exemplary block flow diagram depicting a computer-implemented implementation engine method 1000, according to an aspect. For example, the implementation engine at method 1000 may correspond to block 250. The method 1000 includes two options for implementation, as in FIG. 9, for example. At block 1002, the method 1000 may perform an implementation initiation deployment of an infrastructure-as-code module generated at block 914 and/or an infrastructure-as-code module for selected workbenches generated at block 924, in some aspects. At block 1004, the method 1000 may include determining whether the user will perform a manual or automated deployment.

The customer-driven (i.e., manual) deployment may generally be a less expensive option for the customer, and may include providing the customer with a set of step-by-step instructions of how to deliver implementation of the customer's existing secure infrastructure (e.g., the current computing environment 106 of FIG. 1), to a new build architecture (e.g., the future computing environment 108 of FIG. 1) based on the options provided to the customer in the method 900, for example. In that case, as in block 1006, the customer's future computing environment 108 is owned/controlled by the customer, such as in the customer's on-premise environment, cloud environment, multi-cloud environment, etc. The infrastructure-as-code generated in method 900 may be shared with the customer in exchange for some form of consideration, at block 1006.

In some aspects, the customer chooses a one-click deployment at block 1004. This may generally be a more costly option that leverages the proprietor's infrastructure. The customer may receive documentation and the final product, whether multi-cloud, on premise, one cloud, etc., is generated at block 1008, with all artifacts connected and ready to be consumed by the customer. In particular a continuous deployment and/or continuous integration tool may deploy data solutions of the customer, including selected work benches, in the future computing environment 108. The deployed data, code and services composing the infrastructure-as-code may include those identified in earlier methods by the one or more ML models as optimizing the customer's chosen characteristics (e.g., cost, availability, robustness, security, resilience, reusability, ease of integration, interoperability, industry buzz, etc.). At block 1008, the method 1000 may identify, for example, multiple potentially competitive data services (e.g., Amazon S3, Amazon EC2, Amazon Redshift, Amazon RDS, etc.) and make ML-based decisions on how to stage them together. The final product at block 1008 may be a computing infrastructure, allocated and ready to lift and shift data and applications, advantageously enabling the customer to perform a turnkey transition into a cloud environment from an on premises, for example.

When the user chooses a manual deployment strategy at block 1003, the method 1000 may include generating a document or visualization highlighting the benefits of the infrastructure-as-code, including a description of how the infrastructure accomplishes the customer's objectives (e.g., cost, availability, security, one cloud, multi-cloud, etc.). The method 1000 may include generating infrastructure diagrams, tracking and monitoring, and alerting services. The method 1000 may generate a step-by-step visualization depicting how to connect various components/ instructions, traceability, data lineage, and views for different building blocks. This advantageously assists the customer to monitor, learn and contribute feedback, by including visualization of building blocks. This represents an improvement over current techniques that do not include any visual guide, thereby improving deployment techniques by improving ease of implementation of end user equipment data. Further, the method 1000 may enable the customer to perform a time-limited test of the infrastructure-as-code, advantageously enabling the customer to selectively test limited parts of the system (another improvement over conventional techniques) to determine how data will look in the end state of the new environment, before devoting resources deploying the customer's entire environment in one fell swoop.

In operation, the implementation engine of method 1000 captures the customer's deployment preferences. The customer has the option to deploy the infrastructure as code modules manually using the provided detailed step by step documentation or the method 1000 may deploy the future data solutions (e.g., through automation scripts) based on the customer's environment preference. Both the infrastructure as code module and automated deployment may include selected data solutions and selected workbenches. The implementation engine of the method 1000 may also generate documentation with details of recommendation for visualization tools that can be used.

Exemplary Computer-Implemented Continuous Deployment Methods

As noted, the continuous deployment method at block 1008 may continuously retrain one or more ML models and update the customer environment based on new predictive outcomes. For example, the ML model at block 634c of the method 630 may be continuously updated. In an aspect, the method 1000 periodically (depending upon the user preference, e.g., quarterly, every 6 months, every year etc.) monitors the current landscape of the enterprise and recommend areas of improvement based on latest innovation and introduction of new services or update to existing services. The model at block 634c may analyze the API collection information at block 632c, and identify a service not labeled yet (i.e., outlier). The model may retrain model with this new service information. Doing so may cause the knowledge engine 636 to be updated. The method 1000 may include instructions for regenerating the infrastructure-as-code when any underlying model changes.

In some aspects, the current techniques may include a monitoring module in the memory 122 of the server 104 of FIG. 1 (not depicted) that performs logging at the application and/or infrastructure levels. In an aspect, the monitoring module is implemented using an open source software package (e.g., Splunk, dynatrace, etc.). Information generated by the monitoring module may be standardized and used as input to one or more ML model, or made into a knowledge engine at block 210. Further, the present techniques may include an event-driven system that propagates changes detected by the monitoring module to other systems/methods (e.g., the method 1000) so that the customer's future computing environment, which may already be in use, can be reevaluated in view of new information.

Figure 11A:
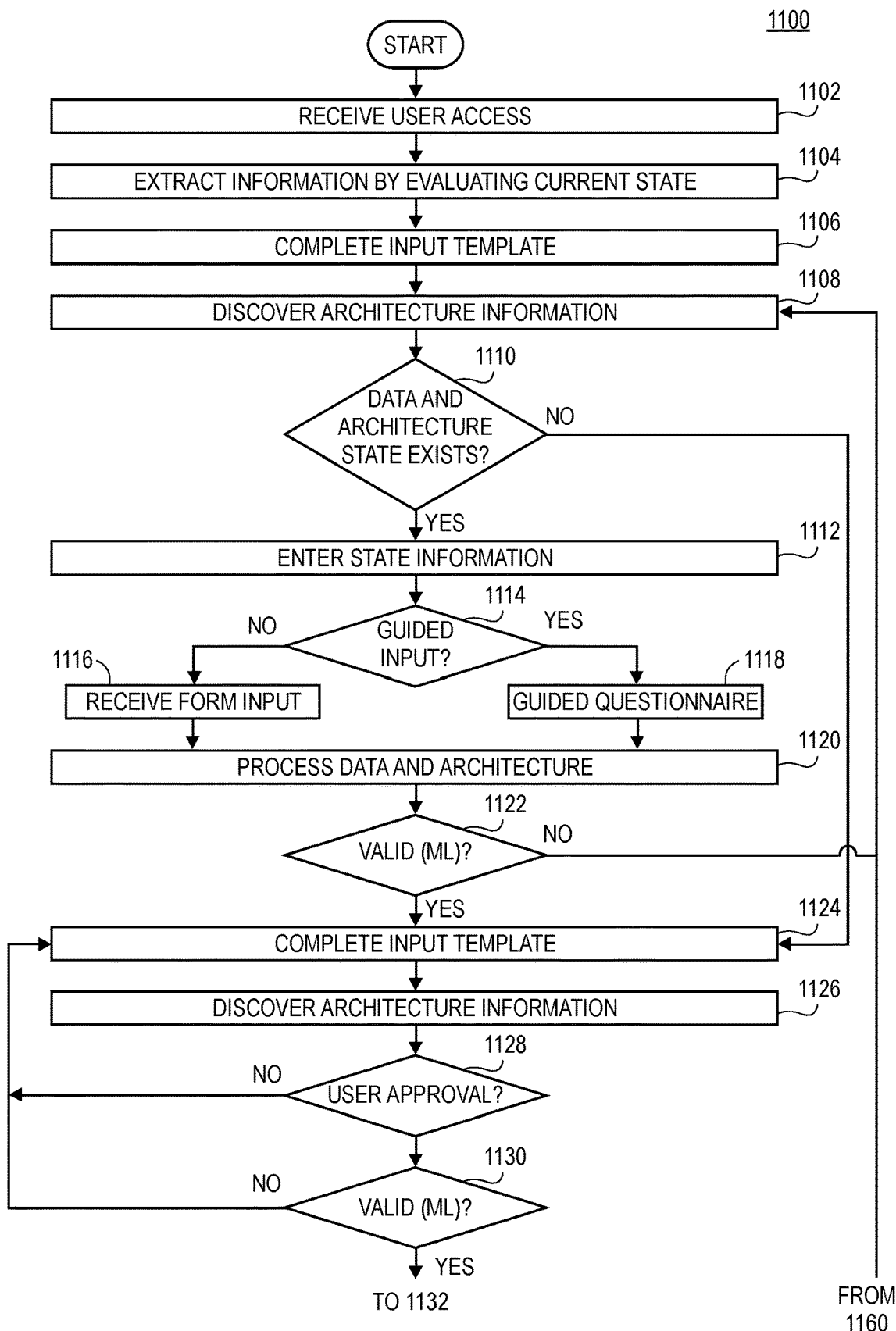
FIG. 11A is an exemplary flow diagram depicting a computer-implemented method for automated cloud data and technology solution delivery using machine learning and artificial intelligence modeling, according to an aspect.
Figure 11B:
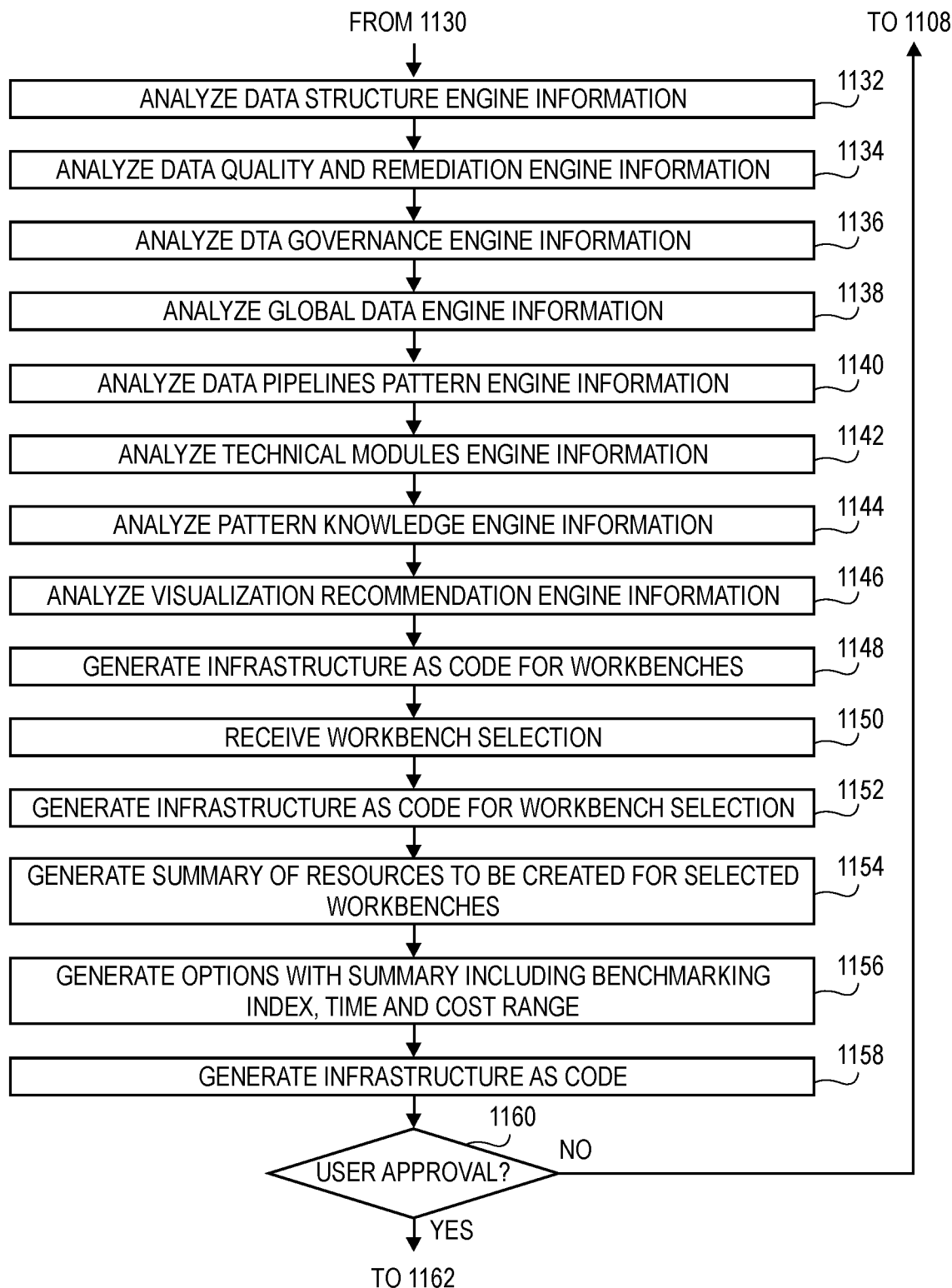
FIG. 11B is an exemplary flow diagram depicting a computer-implemented method for automated cloud data and technology solution delivery using machine learning and artificial intelligence modeling, according to an aspect.
Figure 11C:
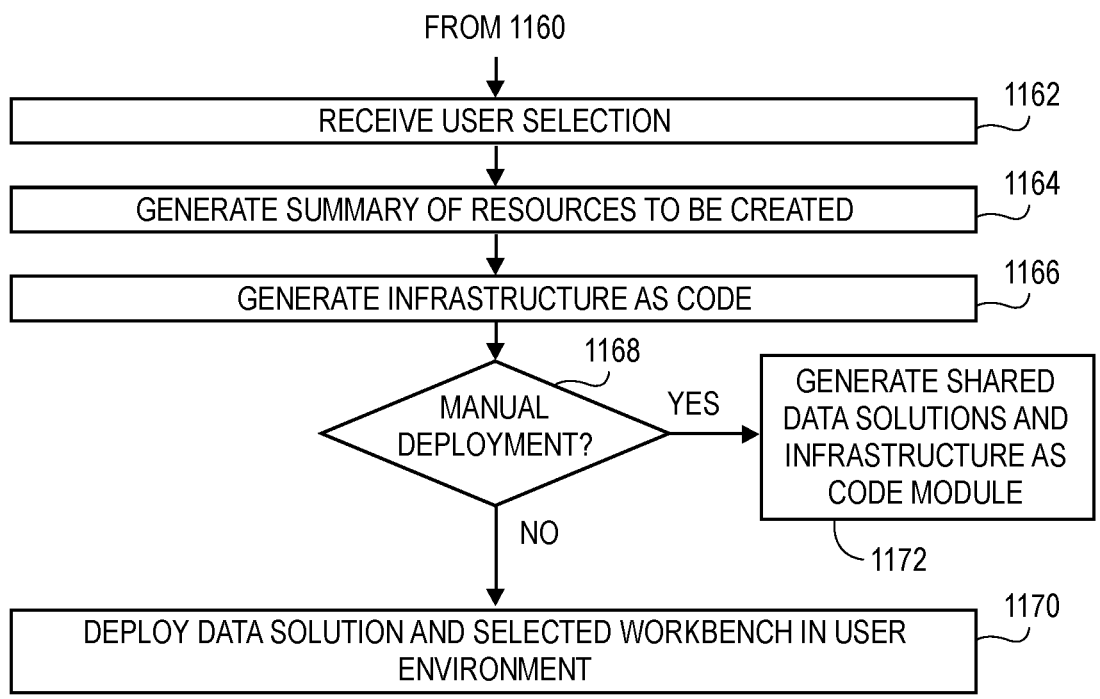
FIG. 11C is an exemplary flow diagram depicting a computer-implemented method for automated cloud data and technology solution delivery using machine learning and artificial intelligence modeling, according to an aspect.

Exemplary Computer-Implemented Automated Cloud Data and Technology Solution Delivery Using Machine Learning and Artificial Intelligence Modeling Methods FIG. 11A, FIG. 11B and FIG. 11C depict an exemplary flow diagram depicting a computer-implemented method 1100 for automated cloud data and technology solution delivery using machine learning and artificial intelligence modeling, according to an aspect.

The method 1100 includes receiving user access (block 1102). The user access may occur at the server 104, whereupon the user accesses the server via the client computing device 102. The user may be the customer or a proprietor employee, in some aspects. The server 104 may facilitate access (e.g., via the I/O module 146).

The method 1100 may include extracting information by evaluating a current state (block 1104), such as the state of the current computing environment 106. Evaluating the current state may include scanning the computing environment 106, for example, as discussed above with respect to FIG. 2 and FIG. 3. The method 1100 may include proactively evaluating current data and architecture landscape to extract information and complete an input template.

The method 1100 may include completing an input template (block 1106), as discussed above with respect to FIG. 4 and/or FIG. 5. In some aspects, the method 1100 may request input data and architecture information directly from the user.

The method 1100 may include discovering architecture information (block 1108). The discovery may include analyzing the information extracted at block 1104 using one or more ML models, and/or querying existing architecture information (e.g., from the electronic database 126 of FIG. 1). For example, a query may be performed based on an unique identifier (e.g., a universally unique identifier (UUID)) associated with the customer.

The method 1100 may include determining whether the architecture information generated at block 1108 to determine whether a data and architecture state exists (block 1110), for example, as discussed with respect to block 404 of FIG. 4. When state information exists, the state information may be analyzed and entered into an electronic template form (block 1112), as discussed with respect to the method 500 of FIG. 5, above. When state information does not exist, control flow of the method may proceed to the block 1124, below.

The method may determine whether the user desires a guided input or unattended input session (block 1114), for example, as discussed with respect to block 410 of FIG. 4, above.

When the user desires an guided input session, the method 1100 may include receiving form input from one or more trained ML models (block 1116). For example, the trained ML model may be trained and operated by the validation module 150, and operated in a loop as discussed with respect to the method 400 of FIG. 4. Responses of the user may be processed using NLP, as discussed with respect to FIG. 5.

When the user desires a guided input session, the method may include collecting information from the user via the I/O module 146 of FIG. 1, in a guided questionnaire procedure (block 1118).

The method 1100 may include processing the output of the ML-based procedure at block 1116, and/or the guided questionnaire at block 1118 (block 1120).

The method 1100 may determine whether the input is valid (block 1122). When the input is valid, the method may include requesting input for a future data and architecture state from the user (block 1124). When the input is invalid, control flow of the method 110 may return to the block 1108.

The method 1100 may process the future data and architecture state input, and generate one or more objectives and intents (block 1126). This step may include processing user responses with NLP, as discussed above.

The method 1100 may include providing the user with a preview of the objectives (block 1128). When the user approves, the method 1100 may analyze the future state and architecture information to determine that it is valid (e.g., connectors are present) (block 1130). If the user does not approve, control flow of the method 1100 may revert to block 1124. If the future state is not valid at block 1130, control flow of the method 1100 may return to the block 1124.

The method 1100 may include analyzing the input and extracting corresponding information from a data structure engine (block 1132). For example, the method 1100 may extract information from the data structure engine 212 of FIG. 2.

The method 1100 may include analyzing the input and extracting corresponding information from a data quality and remediation engine (block 1134). For example, the method 1100 may extract information from the data quality and remediation engine 214 of the knowledge engines 210 of FIG. 2.

The method 1100 may include analyzing the input and extracting corresponding information from a data governance engine (block 1136). For example, the method 1100 may extract information from the data governance engine 216 of the knowledge engines 210 of FIG. 2.

The method 1100 may include analyzing the input and extracting corresponding information from a data governance engine (block 1136). For example, the method 1100 may extract information from the data governance engine 216 of the knowledge engines 210 of FIG. 2.

The method 1100 may include analyzing the input and extracting corresponding information from a global data engine (block 1138). For example, the method 1100 may extract information from the global data engine 218 of the knowledge engines 210 of FIG. 2.

The method 1100 may include analyzing the input and extracting corresponding information from a data pipelines pattern engine (block 1140). For example, the method 1100 may extract information from the data pipeline pattern engine 220 of the knowledge engines 210 of FIG. 2.

The method 1100 may include analyzing the input and extracting corresponding information from a technical modules engine (block 1142). For example, the method 1100 may extract information from the technical modules engine 222 of the knowledge engines 210 of FIG. 2.

The method 1100 may include analyzing the input and extracting corresponding information from a pattern knowledge engine (block 1144). For example, the method 1100 may extract information from the pattern knowledge engine 224 of the knowledge engines 210 of FIG. 2.

The method 1100 may include analyzing the input and extracting corresponding information from a data visualization recommendation engine (block 1146). For example, the method 1100 may extract information from the visualization engine 226 of the knowledge engines 210 of FIG. 2.

The method 1100 may include generating infrastructure-as-code for one or more workbenches (block 1152), such as a data science workbench, a visualization workbench and/or a developer workbench, as discussed with respect to FIG. 9, for example.

The method 1100 may include generating a summary of resources to be created for one or more selected workbenches (block 1154).

The method 1100 may include generating a number of options (e.g., a top three options) using ML, with a summary including a benchmarking index, a time and a cost range (block 1156).

The method 1100 may include generating infrastructure-as-code for the selected workbenches (block 1158).

The method 1100 may include receiving customer approval of one of the options (block 1160). If the customer does not approve, control flow of the method 1100 may return to block 1108.

The method 1100 may include receiving a single selection of the customer (block 1162). For example, the customer may select a deployment option including maximized scalability.

The method 1100 may include generating a summary of resources to be used in the deployment selected at block 1162 (block 1164).

The method 1100 may include generating infrastructure-as-code for the deployment (block 1166).

The method may determine whether the customer will manually deploy the infrastructure-as-code. When the customer prefers that the proprietor deploy the infrastructure as code, the method 1100 may include deploying the solution and selected workbench (if any) in the customer's environment (e.g., the future computing environment 108) (block 1170). When the customer is performing a manual deployment, the method 1100 includes generating shared data solutions and an infrastructure-as-code module (block 1172).

Additional Considerations

With the foregoing, users whose data is being collected and/or utilized may first opt-in. After a user provides affirmative consent, data may be collected from the user's device (e.g., a mobile computing device). In other embodiments, deployment and use of neural network models at a client or user device may have the benefit of removing any concerns of privacy or anonymity, by removing the need to send any personal or private data to a remote server.

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" or "an one aspect" in various places in the specification are not necessarily all referring to the same embodiment.

As used herein, the terms "comprises," "comprising," "includes," "including," "has,""having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory product to which it is communicatively coupled. A further hardware module may then, at a later time, access the memory product to retrieve and process the stored output. Hardware modules may also initiate communications with input or output products, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a building environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a building environment, an office environment, or a server farm). In other example embodiments, the one or more processors or processor-implemented modules may be distributed across a number of geographic locations.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Upon reading this disclosure, those of skill in the art will appreciate still additional alternative structural and functional designs for the method and systems described herein through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

1. A computer-implemented method for automated cloud data and technology solution delivery using machine learning and artificial intelligence modeling, comprising: receiving input current data and architecture state information; analyzing the input current data and/or architecture state information using a first machine learning model trained by accessing codified knowledge; receiving input future data and architecture state information; analyzing the input future data and/or architecture state information using a second machine learning model trained by analyzing one or more historical labeled inputs; and generating infrastructure-as-code corresponding to a future computing environment.

2. The computer-implemented method of aspect 1, further comprising: training the first machine learning model to analyze first data and architecture state input information corresponding to the current computing environment; training the second machine learning model to analyze second data and architecture state input information corresponding to the future computing environment; and analyzing the input future data using a knowledge engine to generate extracted information.

3. The computer-implemented method of aspect 2, wherein the knowledge engine is selected from the group consisting of a data structure engine, a data quality and remediation engine, a data governance engine, a global data/enterprise engine, a data pipeline pattern engine, a technical modules engine, a pattern knowledge engine; or a data visualization engine.

4. The computer-implemented method of any of aspects 1-3, further comprising: generating an input template electronic form including the input future data and architecture state information.

5. The computer-implemented method of aspects 1-4, further comprising: processing one or more user response using natural language processing to determine one or more desired characteristic of the future computing environment.

6. The computer-implemented method of aspects 1-5, further comprising: generating a number of deployment options using a trained machine learning model, wherein the deployment options include at least one of a one-click deployment or a manual delivery deployment.

7. The computer-implemented method of aspect 6, further comprising: displaying the deployment options to a user.

8. A computing system for automated cloud data and technology solution delivery using machine learning and artificial intelligence modeling, comprising: one or more processors; and a memory comprising instructions, that when executed, cause the computing system to: receive input current data and architecture state information; analyze the input current data and/or architecture state information using a first machine learning model trained by accessing codified knowledge; receive input future data and architecture state information; analyze the input future data and/or architecture state information using a second machine learning model trained by analyzing one or more historical labeled inputs; and generate infrastructure-as-code corresponding to a future computing environment.

9. The computing system of aspect 8, the memory comprising further instructions that, when executed, cause the system to: train the first machine learning model to analyze first data and architecture state input information corresponding to the current computing environment; train the second machine learning model to analyze second data and architecture state input information corresponding to the future computing environment; and analyze the input future data using a knowledge engine to generate extracted information.

10. The computing system of aspect 9, the memory comprising further instructions wherein the knowledge engine is selected from the group consisting of: a data structure engine, a data quality and remediation engine, a data governance engine, a global data/enterprise engine, a data pipeline pattern engine, a technical modules engine, a pattern knowledge engine; or a data visualization engine.

11. The computing system of any of aspects 8-10, the memory comprising further instructions that, when executed, cause the system to: generate an input template electronic form including the input future data and architecture state information.

12. The computing system of aspect 8-11, the memory comprising further instructions that, when executed, cause the system to: process one or more user response using natural language processing to determine one or more desired characteristic of the future computing environment.

13. The computing system of aspect 8, the memory comprising further instructions that, when executed, cause the system to: generate a number of deployment options using a trained machine learning model wherein the deployment options include at least one of a one-click deployment or a manual delivery deployment.

14. The computing system of aspect 13, the memory comprising further instructions that, when executed, cause the system to: display the deployment options to a user.

15. A non-transitory computer-readable storage medium storing executable instructions that, when executed by a processor, cause a computer to: receive input current data and architecture state information; analyze the input current data and/or architecture state information using a first machine learning model trained by accessing codified knowledge; receive input future data and architecture state information; analyze the input future data and/or architecture state information using a second machine learning model trained by analyzing one or more historical labeled inputs; and generate infrastructure-as-code corresponding to a future computing environment.

16. The non-transitory computer-readable storage medium of aspect 15, storing further executable instructions that, when executed, cause a computer to: train the first machine learning model to analyze first data and architecture state input information corresponding to the current computing environment; train the second machine learning model to analyze second data and architecture state input information corresponding to the future computing environment; and analyze the input future data using a knowledge engine to generate extracted information.

17. The non-transitory computer-readable storage medium of aspect 15 or 16, storing further executable instructions that, when executed, cause a computer to: generate an input template electronic form including the input future data and architecture state information.

18. The non-transitory computer-readable storage medium of any of aspects 15-17, storing further executable instructions that, when executed, cause a computer to: process one or more user response using natural language processing to determine one or more desired characteristic of the future computing environment.

19. The non-transitory computer-readable storage medium of any of aspects 15-18, storing further executable instructions that, when executed, cause a computer to: generate a number of deployment options using a trained machine learning model wherein the deployment options include at least one of a one-click deployment or a manual delivery deployment.

20. The non-transitory computer-readable storage medium of aspect 19, storing further executable instructions that, when executed, cause a computer to: display the deployment options to a user.

Thus, many modifications and variations may be made in the techniques, methods, and structures described and illustrated herein without departing from the spirit and scope of the present claims. Accordingly, it should be understood that the methods and apparatus described herein are illustrative only and are not limiting upon the scope of the claims.

What is claimed:

1. A computer-implemented method for improving codification of institutional knowledge using machine learning and artificial intelligence modeling, comprising:
   receiving input current data and architecture state information;
   analyzing the input current data and/or architecture state information using a first machine learning model trained by accessing codified knowledge;
   receiving input future data and architecture state information;
   analyzing the input future data and/or architecture state information using a second machine learning model trained by analyzing one or more historical labeled inputs; and
   generating infrastructure-as-code corresponding to a future computing environment.

2. The computer-implemented method of claim 1, further comprising:
   training the first machine learning model to analyze first data and architecture state input information corresponding to the current computing environment;
   training the second machine learning model to analyze second data and architecture state input information corresponding to the future computing environment; and
   analyzing the input future data using a knowledge engine to generate extracted information.

3. The computer-implemented method of claim 2, wherein the knowledge engine is selected from the group consisting of a data structure engine, a data quality and remediation engine, a data governance engine, a global data/enterprise engine, a data pipeline pattern engine, a technical modules engine, a pattern knowledge engine; or a data visualization engine.

4. The computer-implemented method of claim 1, further comprising:
   generating an input template electronic form including the input future data and architecture state information.

5. The computer-implemented method of claim 1, further comprising:
   processing one or more user response using natural language processing to determine one or more desired characteristic of the future computing environment.

6. The computer-implemented method of claim 1, further comprising:
   generating a number of deployment options using a trained machine learning model, wherein the deployment options include at least one of a one-click deployment or a manual delivery deployment.

7. The computer-implemented method of claim 6, further comprising:
   displaying the deployment options to a user.

8. A computing system, comprising:
one or more processors; and
a memory having stored thereon instructions, that when executed, cause the computing system to:
receive input current data and architecture state information;
analyze the input current data and/or architecture state information using a first machine learning model trained by accessing codified knowledge;
receive input future data and architecture state information;
analyze the input future data and/or architecture state information using a second machine learning model trained by analyzing one or more historical labeled inputs; and
generate infrastructure-as-code corresponding to a future computing environment.

9. The computing system of claim 8, the memory having stored thereon further instructions that, when executed, cause the system to:
train the first machine learning model to analyze first data and architecture state input information corresponding to the current computing environment;
train the second machine learning model to analyze second data and architecture state input information corresponding to the future computing environment; and
analyze the input future data using a knowledge engine to generate extracted information.

10. The computing system of claim 9, the memory having stored thereon further instructions wherein the knowledge engine is selected from the group consisting of:
a data structure engine, a data quality and remediation engine, a data governance engine, a global data/enterprise engine, a data pipeline pattern engine, a technical modules engine, a pattern knowledge engine; or a data visualization engine.

11. The computing system of claim 8, the memory having stored thereon further instructions that, when executed, cause the system to:
generate an input template electronic form including the input future data and architecture state information.

12. The computing system of claim 8, the memory having stored thereon further instructions that, when executed, cause the system to:
process one or more user response using natural language processing to determine one or more desired characteristic of the future computing environment.

13. The computing system of claim 8, the memory having stored thereon further instructions that, when executed, cause the system to:
generate a number of deployment options using a trained machine learning model wherein the deployment options include at least one of a one-click deployment or a manual delivery deployment.

14. The computing system of claim 13, the memory having stored thereon further instructions that, when executed, cause the system to:
display the deployment options to a user.

15. A non-transitory computer-readable storage medium having stored thereon executable instructions that, when executed by a processor, cause a computer to:
receive input current data and architecture state information;
analyze the input current data and/or architecture state information using a first machine learning model trained by accessing codified knowledge;
receive input future data and architecture state information;
analyze the input future data and/or architecture state information using a second machine learning model trained by analyzing one or more historical labeled inputs; and
generate infrastructure-as-code corresponding to a future computing environment.

16. The non-transitory computer-readable storage medium of claim 15, having stored thereon further executable instructions that, when executed, cause a computer to:
train the first machine learning model to analyze first data and architecture state input information corresponding to the current computing environment;
train the second machine learning model to analyze second data and architecture state input information corresponding to the future computing environment; and
analyze the input future data using a knowledge engine to generate extracted information.

17. The non-transitory computer-readable storage medium of claim 15, having stored thereon further executable instructions that, when executed, cause a computer to:
generate an input template electronic form including the input future data and architecture state information.

18. The non-transitory computer-readable storage medium of claim 15, having stored thereon further executable instructions that, when executed, cause a computer to:
process one or more user response using natural language processing to determine one or more desired characteristic of the future computing environment.

19. The non-transitory computer-readable storage medium of claim 15, having stored thereon further executable instructions that, when executed, cause a computer to:
generate a number of deployment options using a trained machine learning model wherein the deployment options include at least one of a one-click deployment or a manual delivery deployment.

20. The non-transitory computer-readable storage medium of claim 19, having stored thereon further executable instructions that, when executed, cause a computer to:
display the deployment options to a user.

* * * * *

UNITED STATES PATENT AND TRADEMARK OFFICE
CERTIFICATE OF CORRECTION

| | | |
|---|---|---|
| PATENT NO. | : 11,645,548 B1 | Page 1 of 1 |
| APPLICATION NO. | : 17/856521 | |
| DATED | : May 9, 2023 | |
| INVENTOR(S) | : Sastry Vsm Durvasula et al. | |

It is certified that error appears in the above-identified patent and that said Letters Patent is hereby corrected as shown below:

On the Title Page

Item (74), Line 1, "Gerstein," should be -- Gerstein --.

Signed and Sealed this
Twenty-first Day of May, 2024

*Katherine Kelly Vidal*

Katherine Kelly Vidal
*Director of the United States Patent and Trademark Office*